US012589301B2

(12) United States Patent
Yuan

(10) Patent No.: US 12,589,301 B2
(45) Date of Patent: Mar. 31, 2026

(54) VIDEO FRAME RENDERING METHOD AND APPARATUS

(71) Applicant: TENCENT TECHNOLOGY (SHENZHEN) COMPANY LIMITED, Shenzhen (CN)

(72) Inventor: Junxiao Yuan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 385 days.

(21) Appl. No.: 18/318,780

(22) Filed: May 17, 2023

(65) Prior Publication Data

US 2023/0285857 A1 Sep. 14, 2023

Related U.S. Application Data

(63) Continuation of application No. PCT/CN2022/111061, filed on Aug. 9, 2022.

(30) Foreign Application Priority Data

Aug. 31, 2021 (CN) .......................... 202111010058.0

(51) Int. Cl.
*A63F 13/00* (2014.01)
*A63F 13/52* (2014.01)
(Continued)

(52) U.S. Cl.
CPC ............ *A63F 13/533* (2014.09); *A63F 13/52* (2014.09); *A63F 13/537* (2014.09); *A63F 13/55* (2014.09);
(Continued)

(58) Field of Classification Search
None
See application file for complete search history.

(56) References Cited

U.S. PATENT DOCUMENTS 8,451,325 B2 * 5/2013 Birnbaum ............ H04N 13/354
348/55
9,183,672 B1 * 11/2015 Hickman ................ G06T 17/00
(Continued)

FOREIGN PATENT DOCUMENTS

CN 111214828 A 6/2020
CN 112891936 A 6/2021
(Continued)

OTHER PUBLICATIONS

Translation of CN 113230651 accessed at Google Patents (Year: 2021).*
(Continued)

*Primary Examiner* — Paul A D'Agostino
(74) *Attorney, Agent, or Firm* — Sughrue Mion, PLLC

(57) ABSTRACT

A video frame rendering method and apparatus which belong to the field of computer technologies. The method includes: acquiring, by a server, a first video frame corresponding to a first terminal the first video frame being obtained by rendering a target virtual scene comprising a plurality of virtual objects; rendering, by the server, a new target virtual object based on a customization setting and an original target virtual object of the plurality of virtual objects; substituting the original target virtual object in the first video frame with the new target virtual object to obtain a second video frame; and transmitting, by the server, the second video frame to a first terminal, the first terminal being configured to display the second video frame.

20 Claims, 9 Drawing Sheets

(51) Int. Cl.

| | | |
|---|---|---|
| *A63F 13/533* | (2014.01) | |
| *A63F 13/537* | (2014.01) | |
| *A63F 13/55* | (2014.01) | |
| *G06T 15/02* | (2011.01) | |

(52) U.S. Cl.

CPC ........ *G06T 15/02* (2013.01); *A63F 2300/308* (2013.01); *A63F 2300/66* (2013.01)

(56) References Cited

U.S. PATENT DOCUMENTS

| | | | | |
|---|---|---|---|---|
| 9,674,563 | B2 * | 6/2017 | Wheatley | H04N 21/44218 |
| 9,704,270 | B1 * | 7/2017 | Main | G06T 15/60 |
| 10,127,783 | B2 * | 11/2018 | Laska | G08B 13/19652 |
| 10,158,917 | B1 * | 12/2018 | Logan | H04N 21/4788 |
| 10,217,185 | B1 * | 2/2019 | Cabanero | H04L 41/22 |
| 10,244,228 | B2 * | 3/2019 | Millett | H04N 13/271 |
| 10,402,209 | B2 * | 9/2019 | Rieger | A63F 13/216 |
| 10,445,938 | B1 * | 10/2019 | Poliakov | G06V 10/82 |
| 2006/0036756 | A1 * | 2/2006 | Driemeyer | H04N 21/21 |
| | | | | 707/E17.116 |
| 2010/0188488 | A1 * | 7/2010 | Birnbaum | H04N 21/4884 |
| | | | | 348/744 |
| 2012/0192115 | A1 * | 7/2012 | Falchuk | G06F 3/04883 |
| | | | | 715/850 |
| 2013/0036164 | A1 * | 2/2013 | Carduner | G06Q 30/02 |
| | | | | 709/204 |
| 2014/0129966 | A1 * | 5/2014 | Kolesnikov | G06F 8/38 |
| | | | | 715/765 |
| 2014/0168272 | A1 * | 6/2014 | Chedeau | G06Q 50/01 |
| | | | | 345/660 |
| 2015/0262402 | A1 * | 9/2015 | Heinz, II | H04N 21/6582 |
| | | | | 345/581 |
| 2016/0093078 | A1 * | 3/2016 | Davis | G11B 27/034 |
| | | | | 345/629 |
| 2016/0127508 | A1 * | 5/2016 | Perrin | A63F 13/335 |
| | | | | 709/219 |
| 2016/0364397 | A1 * | 12/2016 | Lindner | H04L 65/764 |
| 2017/0032568 | A1 * | 2/2017 | Gharpure | G06T 13/20 |
| 2017/0180435 | A1 * | 6/2017 | Edwards | H04L 65/762 |
| 2018/0005026 | A1 * | 1/2018 | Shaburov | G06T 7/73 |
| 2018/0075820 | A1 * | 3/2018 | Hicks | G06F 3/14 |
| 2018/0095635 | A1 * | 4/2018 | Valdivia | G02B 27/0093 |
| 2018/0133603 | A1 * | 5/2018 | Ninoles | H04N 21/21805 |
| 2018/0370154 | A1 * | 12/2018 | Ludlam | B29C 64/386 |
| 2019/0042627 | A1 * | 2/2019 | Osotio | G06F 16/26 |
| 2019/0042698 | A1 * | 2/2019 | Pohl | G16H 40/63 |
| 2019/0068960 | A1 * | 2/2019 | Jacobs | H04N 13/359 |
| 2019/0088030 | A1 * | 3/2019 | Masterson | G01S 19/01 |
| 2019/0184284 | A1 * | 6/2019 | Quere | A63F 13/358 |
| 2019/0279425 | A1 * | 9/2019 | Yin | G06T 19/006 |
| 2019/0289341 | A1 * | 9/2019 | Vasco de Oliveira Redol | |
| | | | | H04N 23/698 |
| 2019/0304184 | A1 * | 10/2019 | Wrotek | G06T 9/001 |
| 2019/0308099 | A1 * | 10/2019 | Lalonde | A63F 13/352 |
| 2021/0158597 | A1 | 5/2021 | Hagland | |

FOREIGN PATENT DOCUMENTS

| | | |
|---|---|---|
| CN | 113230651 A | 8/2021 |
| CN | 113633971 A | 11/2021 |

OTHER PUBLICATIONS

Translation of CN 112891936 accessed at Google Patents (Year: 2021).*

Translation of CN 111214828 accessed at Google Patents (Year: 2020).*

International Search Report of PCT/CN2022/111061 dated Oct. 26, 2022 [PCT/ISA/210].

Written Opinion of PCT/CN2022/111061 dated Oct. 26, 2022 [PCT/ISA/237].

\* cited by examiner

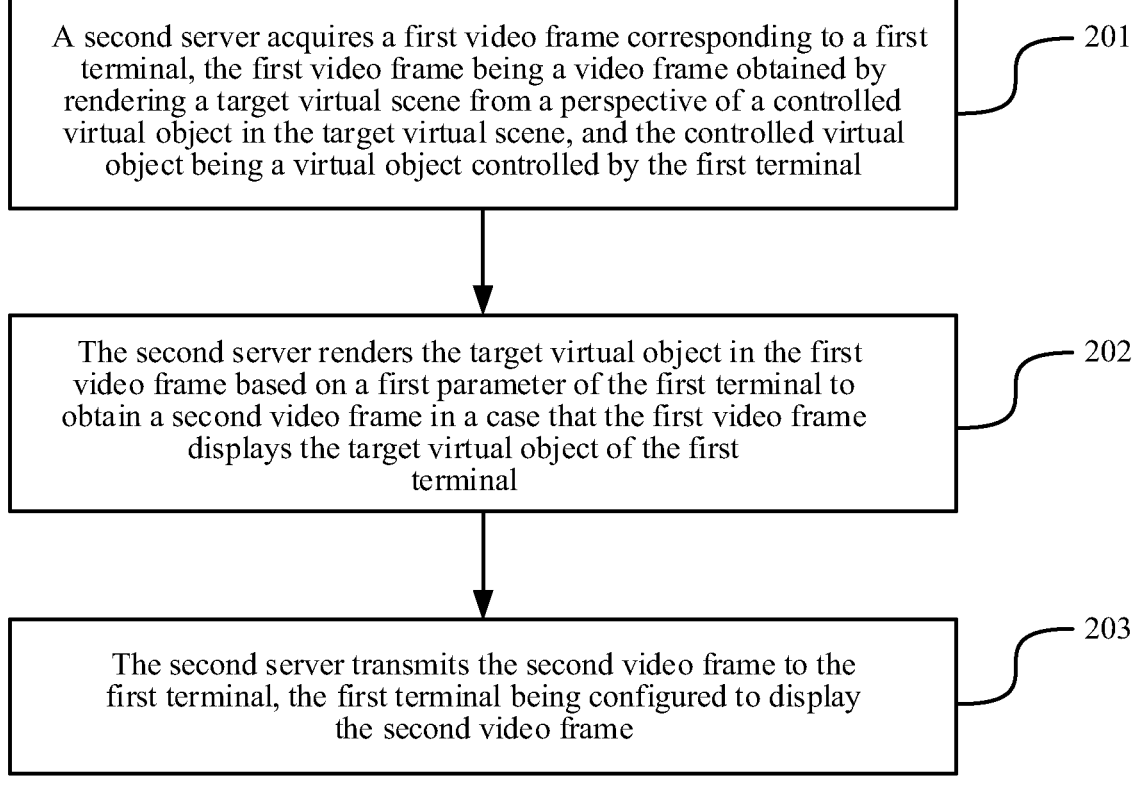

A second server acquires a first video frame corresponding to a first terminal, the first video frame being a video frame obtained by rendering a target virtual scene from a perspective of a controlled virtual object in the target virtual scene, and the controlled virtual object being a virtual object controlled by the first terminal — 201

The second server renders the target virtual object in the first video frame based on a first parameter of the first terminal to obtain a second video frame in a case that the first video frame displays the target virtual object of the first terminal — 202

The second server transmits the second video frame to the first terminal, the first terminal being configured to display the second video frame — 203

FIG. 2

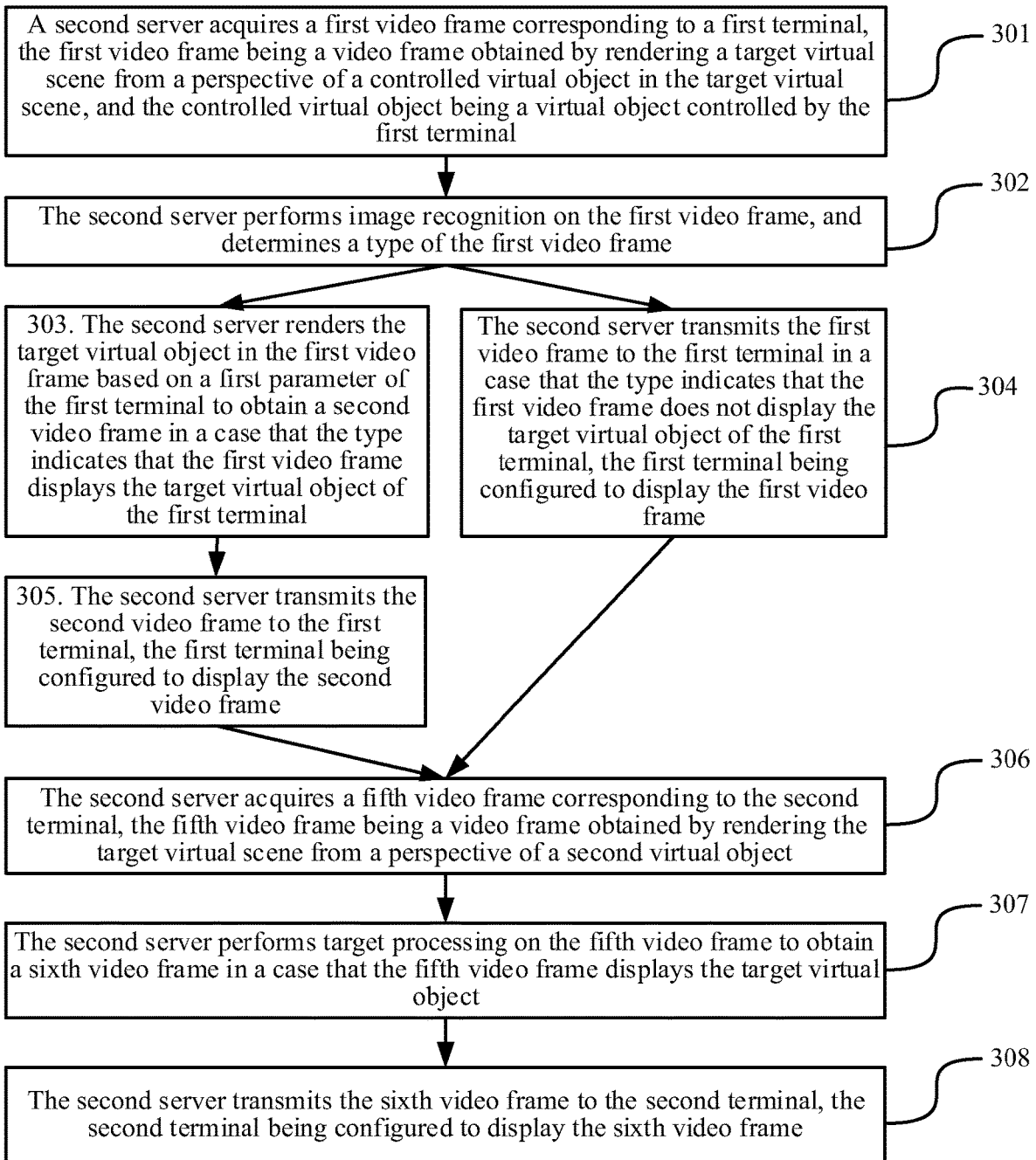

A second server acquires a first video frame corresponding to a first terminal, the first video frame being a video frame obtained by rendering a target virtual scene from a perspective of a controlled virtual object in the target virtual scene, and the controlled virtual object being a virtual object controlled by the first terminal — 301

The second server performs image recognition on the first video frame, and determines a type of the first video frame — 302

303. The second server renders the target virtual object in the first video frame based on a first parameter of the first terminal to obtain a second video frame in a case that the type indicates that the first video frame displays the target virtual object of the first terminal The second server transmits the first video frame to the first terminal in a case that the type indicates that the first video frame does not display the target virtual object of the first terminal, the first terminal being configured to display the first video frame — 304

305. The second server transmits the second video frame to the first terminal, the first terminal being configured to display the second video frame The second server acquires a fifth video frame corresponding to the second terminal, the fifth video frame being a video frame obtained by rendering the target virtual scene from a perspective of a second virtual object — 306

The second server performs target processing on the fifth video frame to obtain a sixth video frame in a case that the fifth video frame displays the target virtual object — 307

The second server transmits the sixth video frame to the second terminal, the second terminal being configured to display the sixth video frame — 308

VIDEO FRAME RENDERING METHOD AND APPARATUS

CROSS REFERENCE TO RELATED APPLICATION

This application is a continuation of PCT/CN2022/111061 filed on Aug. 9, 2022 and claims priority to Chinese Patent Application No. 202111010058.0 filed with the China National Intellectual Property Administration on Aug. 31, 2021, the contents of which is incorporated by reference herein in its entirety.

FIELD

Embodiments of the disclosure relate to the field of computer technologies, and in particular to a video frame rendering method, apparatus, and device, and a storage medium.

BACKGROUND

With the maturity of cloud computing technology, users may achieve tasks that terminals are difficult to complete through cloud computing. For example, in the field of cloud games, a user may play a game that the terminal cannot run smoothly through the cloud computing technology. Background processing related to the game is all completed by a cloud gaming server, and the terminal only needs to transmit control information to the cloud gaming server. The control information is used for controlling a game object in a game scene. The cloud gaming server may perform background processing based on the control information to obtain a video frame. The cloud gaming server transmits the video frame to the terminal. The terminal displays the video frame.

In the related technology, for a certain game object in the game scene, a display effect of the game object is configured in advance by a technician when designing a game, for example, for a car in the game scene, the color and style of the car are configured in advance by the technician.

SUMMARY

Embodiments of the disclosure provide a video frame rendering method, apparatus, and device, and a storage medium, which provide a function of performing secondary rendering on a virtual object in a cloud application. Technical solutions are as follows:

In an aspect, a video frame rendering method is provided. The method includes:

acquiring, by a server, a first video frame corresponding to a first terminal the first video frame being obtained by rendering a target virtual scene comprising a plurality of virtual objects. The method may further include rendering, by the server, a new target virtual object based on a customization setting and an original target virtual object of the plurality of virtual objects. The method may further include substituting the original target virtual object in the first video frame with the new target virtual object to obtain a second video frame. The method may further include transmitting, by the server, the second video frame to a first terminal, the first terminal being configured to display the second video frame.

According to other aspects of one or more embodiments, there is also provided an apparatus and non-transitory computer readable medium consistent with the method.

BRIEF DESCRIPTION OF THE DRAWINGS

To describe the technical solutions in the example embodiments of the disclosure more clearly, the following briefly introduces the accompanying drawings required for describing the example embodiments. The accompanying drawings in the following description show merely some embodiments of the disclosure, and a person of ordinary skill in the art may still derive other accompanying drawings from the accompanying drawings without creative efforts. In addition, one of ordinary skill would understand that aspects of example embodiments may be combined together or implemented alone.

FIG. 2 is a flowchart of a video frame rendering method according to some embodiments.

FIG. 3 is a flowchart of a video frame rendering method according to some embodiments.

DETAILED DESCRIPTION

Figure 1:
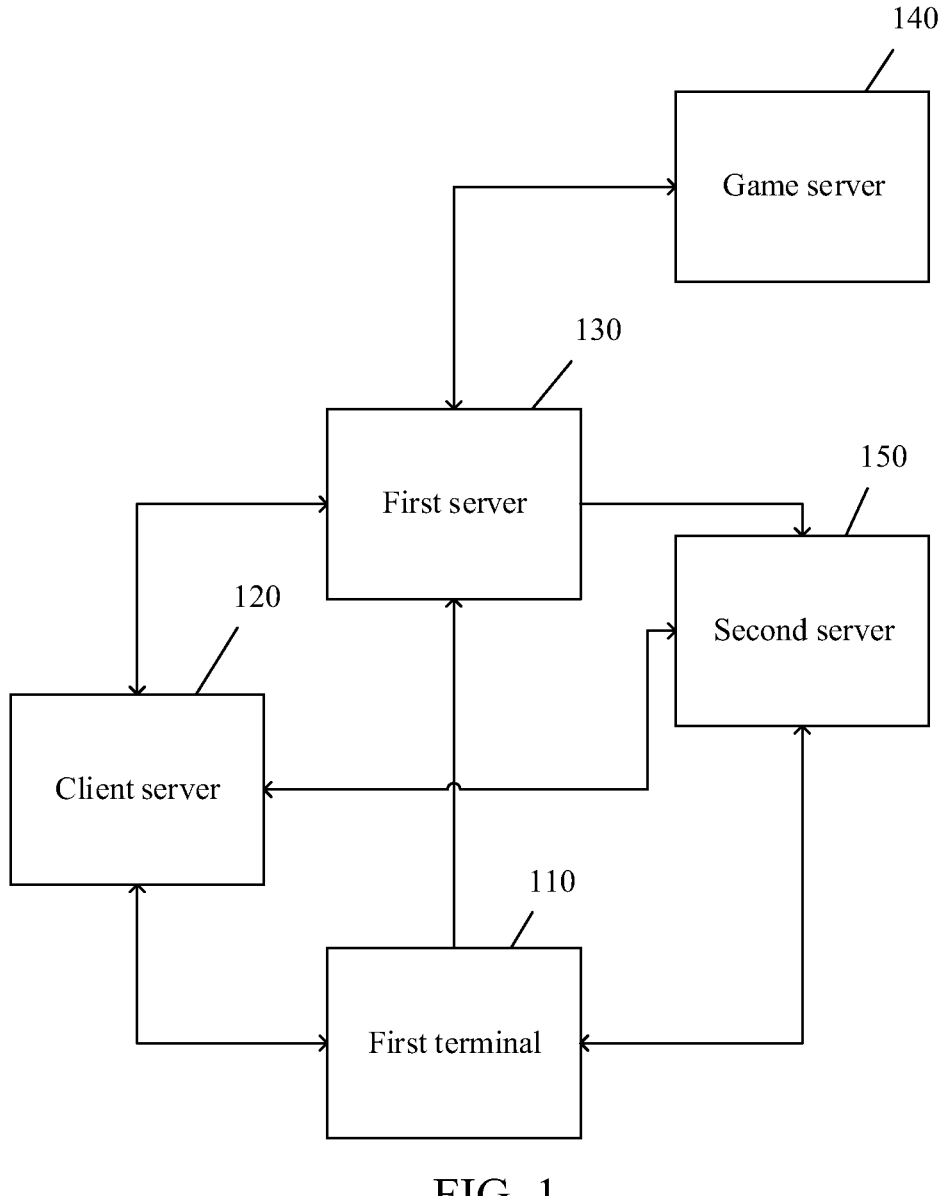
FIG. 1 is a schematic diagram of an implementation environment of a video frame rendering method according to some embodiments.

To make the objectives, technical solutions, and advantages of the disclosure clearer, implementations of the disclosure will be further described in detail with reference to the drawings.

The terms "first", "second", and the like in the disclosure are used for distinguishing between the same or similar items with substantially the same effects and functions. It is to be understood that the terms "first", "second", and "nth" do not have a logical or chronological dependency on each other or limit the number and order of execution.

The term "at least one" in the disclosure refers to one or more, and the meaning of "a plurality" refers to two or more, for example, a plurality of reference face images refers to two or more reference face images.

A cloud application is a new application that changes a usage mode of a conventional application "local installation and local operation" into an "on-demand" service, and connects and manipulates a remote server cluster through Internet or a local area network to complete business logic or a computing task. The cloud application runs in the remote server cluster, but an interface of the cloud application is displayed on the terminal, which may reduce the running cost of the terminal and greatly improve the work efficiency.

Cloud gaming, also known as gaming on demand, is a cloud computing-based online gaming technology, cloud gaming technology enables a thin client that has relatively limited graphics processing and data computing capabilities to run high quality games. In a cloud gaming scene, the game does not run in a player gaming terminal, but runs in a cloud server. The game scene is rendered into a video and audio stream by a cloud gaming server, and is transmitted to the player gaming terminal through a network. The player game terminal does not need to have powerful graphics computing and data processing capabilities, but only have a basic streaming media playing capability and the capability of acquiring player input instructions and transmitting the same to the cloud gaming server.

A virtual scene is a virtual scene that is displayed (or provided) when an application is running. The virtual scene may be a real-world simulation environment, a semi-simulation semi-fictional virtual environment, or a purely fictional virtual environment. The virtual scene may be any one of a two-dimensional virtual scene, a 2.5-dimensional virtual scene, or a three-dimensional virtual scene, and the dimensions of the virtual scene are not limited in the embodiments of the disclosure. For example, the virtual scene may include the sky, a land, a sea, and the like. The land may include an environmental element such as a desert and a city, and a user may control a virtual object to move in the virtual scene.

A virtual object refers to a movable object in the virtual scene. The movable object may be a virtual character, a virtual animal, an animation character, and the like, for example: a character, an animal, a plant, an oil bucket, a wall, and a stone displayed in the virtual scene. The virtual object may be a virtual avatar for representing a user in the virtual scene. A plurality of virtual objects may be included in the virtual scene. Each virtual object has its own shape and volume in the virtual scene, and occupies part space in the virtual scene.

In some embodiments, the virtual object is a player character controlled by an operation on a client, or an artificial intelligence (AI) set in a virtual scene battle, or a non-player character (NPC) set in the virtual scene. In some embodiments, the virtual object is a virtual character competing in the virtual scene. In some embodiments, the quantity of virtual objects participating in an interaction in the virtual scene is preset or is dynamically determined based on the quantity of clients participating in the interaction.

Taking a shooting game as an example, a user may control a virtual object to freely fall, glide or open a parachute to fall, and the like in the sky of the virtual scene, to run, jump, crawl, bend forward, and the like on the land, and may also control the virtual object to swim, float or dive, and the like in the sea. Of course, the user may also control the virtual object to ride on a virtual carrier to move in the virtual scene, for example, the virtual carrier may be a virtual car, a virtual aircraft, a virtual yacht, and the like. The above scene is merely taken as an example herein, and no specific limits are made thereto in the embodiments of the disclosure. The user may also control the interactions, such as fighting, of the virtual object with other virtual objects by means of an interaction prop. For example, the interaction prop may be a throwing interaction prop such as a virtual hand grenade, a virtual cluster mine, and a virtual sticky hand grenade (referred to as a "virtual sticky grenade"), and may also be a shooting interaction prop such as a virtual machine gun, a virtual hand gun, and a virtual rifle, and no specific limits are made to the type of the interaction prop in the embodiments of the disclosure.

An Android container is when an android is packaged into a container image and then is published through a standard container image. A carrier may be a container shell arbitrarily supporting open container initiative (OCI), so that the carrier may be easily maintained through kubernetes (k8s, a container orchestration engine), and may be easily deployed to thousands of server clusters on a cloud by means of a powerful maintenance tool of k8s.

FIG. 1 is a schematic diagram of an implementation environment of a video frame rendering method provided by an embodiment of the disclosure. With reference to FIG. 1, the implementation environment may include a first terminal 110, a client server 120, a first server 130, a game server 140, and a second server 150. In some embodiments, the first terminal 110, the client server 120, the first server 130, the game server 140, and the second server 150 are nodes in a block chain system, and data transmitted between the first terminal 110, the client server 120, the first server 130, the game server 140, and the second server 150 is also stored on the block chain.

The first terminal 110 is connected to the client server 120 through a wireless network or a wired network. The first terminal 110 may be a smart phone, a tablet computer, a notebook computer, a desktop computer, a smart watch, or the like, but is not limited thereto. The first terminal 110 is installed and running with a client supporting virtual scene display.

The client server 120 is a server for providing a service for a client. The client server 120 is an independent physical server, or a server cluster or a distributed system composed of a plurality of physical servers, or a server providing basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The first terminal 110 logs into the client server 120 through a running client. The client server 120 provides a service related to a user account, for example, providing a service related to user account verification, or providing a service for determining a cloud gaming duration corresponding to the user account, or providing a service for storing a personalized setting corresponding to the user account. No limits are made thereto in the embodiments of the disclosure. As it were, the client server 120 is an intermediary connecting the client running on the first terminal 110 and the first server 130.

The first server 130 is an independent physical server, or a server cluster or a distributed system composed of a plurality of physical servers, or a server providing basic cloud computing services such as a cloud service, a cloud database, cloud computing, a cloud function, cloud storage, a network service, cloud communication, a middleware service, a domain name service, a security service, a CDN, big data, and an artificial intelligence platform. The first server 130 is connected to a background service related to displaying a virtual scene, and the first terminal 110 is connected to the first server 130 through a wireless network or a wired network. The first terminal 110 may transmit control information to the first server 130. The control information is used for controlling a virtual object in the virtual scene. The first server 130 renders the virtual scene based on the control information. The first server 130 is connected to the client server 120 through a wireless network or a wired network. The first server 130 may acquire relevant information about a user account from the client server 120, and perform relevant operations such as game initialization based on the relevant information. The first server 130 may be a cloud server.

The game server 140 is an independent physical server, or a server cluster or a distributed system composed of a plurality of physical servers, or a server providing basic cloud computing services such as a cloud service, a cloud database, cloud computing, a cloud function, cloud storage, a network service, cloud communication, a middleware service, a domain name service, a security service, a CDN, big data, and an artificial intelligence platform. The game server 140 is connected to the first server 130 through a wireless network or a wired network. The game server 140 stores information related to a game character, such as friends of the game character, an address book, a level of the game character, a name of the game character, and the like. The first server 130 may acquire the information related to the game character from the game server 140. One user account may correspond to a plurality of game characters. The client server 120 is configured to store the information related to the user account. The game server 140 is configured to store the information related to the game character.

The second server 150 is an independent physical server, or a server cluster or a distributed system composed of a plurality of physical servers, or a server providing basic cloud computing services such as a cloud service, a cloud database, cloud computing, a cloud function, cloud storage, a network service, cloud communication, a middleware service, a domain name service, a security service, a CDN, big data, and an artificial intelligence platform. The second server 150 provides a service related to secondary rendering of the virtual scene. The second server 150 is connected to the first server 130 through a wireless network or a wired network. The first server 130 may transmit a video frame after the virtual scene is rendered to the second server 150. The second server 150 performs secondary rendering on the video frame, so as to realize personalized processing of a user. The second server 150 may transmit the video frame after the secondary rendering to the first terminal 110, and the first terminal 110 displays the video frame after the secondary rendering. In addition, the second server 150 is connected to the client server 120 through a wireless network or a wired network. The second server 150 may acquire a personalized setting corresponding to a user account from the client server 120, and perform secondary rendering on the video frame transmitted by the first server 130 based on the personalized setting to obtain the video frame after the secondary rendering. In some embodiments, the second server 150 is integrated into the first server 130. The function of the second server 150 is implemented by a system running on the first server 130. The second server 150 may be a scene management server.

A person skilled in the art may know that the quantity of the above first terminals may be more or less. For example, there is only one first terminal, there are dozens or hundreds of first terminals, or there are more first terminals. At this time, the above implementation environment further includes other first terminals. No limits are made to the quantity of the first terminals and types of devices in the embodiments of the disclosure.

After an application scene of the video frame rendering method provided by the embodiments of the disclosure, the application scene of the video frame rendering method provided by the embodiments of the disclosure will be described below in combination with the above implementation environment. In the following description process, the first terminal is also the first terminal 110 in the above implementation environment, the client server is also the client server 120 in the above implementation environment, the first server is also the first server 130 in the above implementation environment, and the game server is also the game server 140 in the above implementation environment. The second server is also the second server 150 in the above implementation environment.

The video frame rendering method provided by the embodiments of the disclosure may be applied in various types of cloud gaming scenes, such as in a first-person shooting (FPS) game, or in a third-personal shooting (TPS) game, or in a multiplayer online battle arena (MOBA), or in a chess game or an auto chess game. No limits are made thereto in the embodiments of the disclosure.

Taking an application of the video frame rendering method provided by the embodiments of the disclosure in the FPS game as an example, a user starts a cloud gaming client on a first terminal, and logs in a user account in the cloud gaming client, that is to say, the user inputs the user account and a corresponding password in the cloud gaming client, and clicks a login control to perform login. In response to detecting a click operation on the login control, the first terminal transmits a login request to the client server. The login request carries the user account and the corresponding password. After receiving the login request, the client server acquires the user account and the corresponding password from the login request, and verifies the user account and the corresponding password. After verifying the user account and the corresponding password, the client server transmits login success information to the first terminal. After receiving the login success information, the first terminal transmits a cloud gaming acquisition request to the client server. The cloud gaming acquisition request carries the user account. After acquiring the cloud gaming acquisition request, the client server performs query based on the user account carried in the cloud gaming acquisition request, acquires a plurality of cloud games corresponding to the user account, and transmits identifiers of the plurality of cloud games to the first terminal. The first terminal presents the identifiers of the plurality of cloud games in the cloud gaming client. The user selects, through the first terminal, an identifier of the FPS game to be played from the identifiers of the plurality of cloud games displayed in the cloud gaming client, that is, selects the FPS game to be played. After the user selects the FPS game in the cloud gaming client, the first terminal transmits game start instructions to the client server. The game start instructions carry the user account number, the identifier of the FPS game, and hardware information of the first terminal. The hardware information of the first terminal includes a screen resolution of the first terminal, a model of the first terminal, and the like. No limits are made thereto in the embodiments of the disclosure. After receiving the game start instructions, the client server transmits the game start instructions to the first server. After receiving the game start instructions, the first server acquires the user account, the identifier of the FPS game, and the hardware information of the first terminal from the game start instructions. The first server initializes the FPS game based on the hardware information of the first terminal to realize matching between a rendered game picture and the first terminal, and transmits the user account to the game server corresponding to the FPS game. After receiving the user account, the game server transmits information corresponding to the game account to the first server. The first server starts the FPS game based on the information corresponding to the game account. In a process of running the FPS game, the user may control a controlled virtual object in the FPS to move through the first terminal, that is, the first terminal transmits control information of the controlled virtual object to the first server. The first server renders the virtual scene of the FPS based on the control information to obtain a first video frame. The control information may include a customization setting. The first server transmits the first video frame to the second server. If the user personalizes a certain virtual object in the FPS game before the game starts, for example, sets a car in the FPS game to red, then the second server may perform image recognition on the first video frame and determine whether the first video frame includes the car. If the second server determines that the first video frame displays the car, then a first parameter for the car is acquired from the client server. The first parameter is determined by the client server based on a setting parameter for the car by the user. The second server renders the car in the first video frame based on the first parameter to obtain a second video frame, and transmits the second video frame to the first terminal. The user may view the second video frame through the first terminal. If a technician configures the color of the car to blue in the FPS game, then the color of the car may be adjusted to the user-set red through the above operations to achieve personalized configuration for the car.

The above is described by taking the processing of the first video frame as an example. In the process of running the FPS game, there are a plurality of continuous video frames. The plurality of video frames are all processed in the above mode for the first terminal to display.

In addition, for a MOBA game, a TPS game, a chess game, and an auto chess game, the above operations may all be used for processing. For example, in the MOBA game, the user may set a tree in the MOBA game to a peach blossom through the first terminal, and then the second server may recognize the tree from a first video frame, perform secondary rendering on the tree to obtain the peach blossom to obtain a second video frame, and transmit the second video frame to the first terminal for displaying.

Furthermore, the video frame rendering method provided by the embodiments of the disclosure may also be applied to other types of cloud games besides the above FPS game, MOBA game, chess game, or auto chess game. No limits are made thereto in the embodiments of the disclosure.

After introducing an implementation environment and an application scene of the video frame rendering method provided by the embodiments of the disclosure, the video frame rendering method provided by the embodiments of the disclosure will be described below.

FIG. 2 is a flowchart of a video frame rendering method provided by an embodiment of the disclosure. With reference to FIG. 2, taking the method performed by a second server as an example, the method includes the following operations:

201: A second server acquires a first video frame corresponding to a first terminal, the first video frame being a video frame obtained by rendering a target virtual scene from a perspective of a controlled virtual object in the target virtual scene, and the controlled virtual object being a virtual object controlled by the first terminal.

The operation of rendering the target virtual scene from the perspective of the controlled virtual object in the target virtual scene refers to that: a picture observed by the controlled virtual object in the target virtual scene is rendered. Since the controlled virtual object is a virtual object controlled by the first terminal, the picture observed by the controlled virtual object in the target virtual scene may simulate a picture seen by a user of the first terminal in the target virtual scene.

For different first terminals, different first terminals have different controlled virtual objects. In the same target virtual scene, pictures observed by different controlled virtual objects are to be different, and therefore pictures displayed by different first terminals are also to be different. For this reason, the target virtual scene needs to be rendered from the perspective of the controlled virtual object of the first terminal, and the obtained video frame corresponds to the first terminal.

The first video frame may be rendered by the first server and then transmitted to the second server.

202: The second server renders the target virtual object in the first video frame based on a first parameter of the first terminal to obtain a second video frame in a case that the first video frame displays the target virtual object of the first terminal.

The target virtual object is a virtual object set by the first terminal, and is a virtual object that needs to be re-rendered by the first terminal. For example, the target virtual object is a virtual object selected by the user through the first terminal, or a virtual object selected by the first terminal according to a position of the controlled virtual object, or a virtual object set in other modes. The first parameter is a first parameter of the first terminal, for example, the first parameter is a first parameter determined by the user through the first terminal, or a first parameter set by default by the first terminal. The first parameter is used for re-rendering the target virtual object in the first video frame to obtain the second video frame. Since both the target virtual object and the first parameter are configured through the first terminal, and are not affected by other terminals, personalized configuration for a virtual scene is realized. When it is desired to change a display effect of a certain virtual object in the virtual scene, configuration may be performed directly through the first terminal without contacting a technician to change underlying code and files, which is high in efficiency.

203: The second server transmits the second video frame to the first terminal, the first terminal being configured to display the second video frame.

The video frame rendering method provided by some embodiments of the disclosure is applied in a cloud gaming scene, and then processes of rendering the virtual scene and rendering a video frame are both implemented in a cloud. The cloud here is a generic term of the second server (such as a scene management server), the first server (such as a cloud server), and other relevant servers. After performing secondary rendering on the first video frame, the second server transmits the obtained second video frame to the first terminal. The first terminal directly displays the second video frame without performing background processing, which is high in efficiency.

The embodiment of the disclosure only takes the method performed by the second server as an example. In other embodiments, the method may also be performed by other servers.

Through the technical solutions provided by some embodiments of the disclosure, if it is desired to change a display effect of a certain virtual object, the first parameter may be determined for the virtual object by the first terminal, and secondary rendering is performed on the video frame based on the first parameter to obtain the second video frame. Compared with the first video frame, the display effect of the virtual object displayed in the second video frame is also the display effect configured by the first terminal for the virtual object. Through such technical solutions, a function of performing secondary rendering on the virtual object is provided in a cloud application, and the user may quickly and efficiently adjust the display effect of the certain virtual object in the virtual scene, which extends a functional range of the cloud application and improves the personalization of the cloud application. Therefore, the cloud application is propagated more widely.

The above operations 201 to 203 are a brief introduction to some embodiments of the disclosure. The technical solutions provided by the embodiments of the disclosure will be described more clearly below in combination with some examples. Taking the method performed by the second server as an example, with reference to FIG. 3, the method includes the following operations:

301: A second server acquires a first video frame corresponding to a first terminal, the first video frame being a video frame obtained by rendering a target virtual scene from a perspective of a controlled virtual object in the target virtual scene, and the controlled virtual object being a virtual object controlled by the first terminal.

In a game scene, the target virtual scene is also a game scene of cloud gaming, and the perspective of the controlled virtual object is also a perspective of a virtual camera of the controlled virtual object. In an FPS game, the virtual camera of the controlled virtual object is located at the head of the controlled virtual object. When a user controls the controlled virtual object to move in the target virtual scene through the first terminal, the virtual camera will also move along with the movement of the controlled virtual object, and a picture photographed by the virtual camera is also a picture observed by the controlled virtual object in the target virtual scene. In a TPS game, the virtual camera of the controlled virtual object is located above the controlled virtual object. When the user controls the controlled virtual object to move in the target virtual scene through the first terminal, the virtual camera will also move along with the movement of the controlled virtual object, and a picture photographed by the virtual camera is also a picture observed above the controlled virtual object. In a cloud gaming scene, a picture photographed by the virtual camera is rendered by a cloud gaming server. Since there are a plurality of pictures continuous in timing during gaming, the plurality of pictures are also referred to as video frames. Similarly, in other scenes, the first server may photograph a target virtual scene through the virtual camera to obtain a picture, and the photographed picture is also referred to as a video frame. The first server may be a cloud server.

In some embodiments, the first terminal transmits control information for the controlled virtual object to the first server. After receiving the control information, the first server determines a perspective of the controlled virtual object in the target virtual scene based on the control information. The first server renders the target virtual scene based on the perspective of the controlled virtual object to obtain a first video frame. The first video frame is also a video frame corresponding to the first terminal. The first server transmits the first video frame to the second server. The second server acquires the first video frame. The control information of the controlled virtual object is used for changing a position, an orientation, and an action of the controlled virtual object in the target scene. For example, the control information may control the controlled virtual object to move back, forth, left, and right in the target virtual scene, or may control the controlled virtual object to rotate left or right in the target virtual scene, or may control the controlled virtual object to perform actions such as squatting, creeping, and using a virtual prop in the target virtual scene. When the first server controls the controlled virtual object to move or perform an action in the target virtual scene based on the control information, the virtual camera bound with the controlled virtual object will also move along with the movement of the controlled virtual object. The movement or the action performed by the controlled virtual object will result in a change in the perspective of the controlled virtual object for observing the target virtual scene, and the virtual camera bound to the controlled virtual object may record this change. The first server may be a scene management server.

In some embodiments, the control information of the controlled virtual object may be transmitted to the first server through the first terminal. The first server may determine a perspective of the controlled virtual object in the target virtual scene based on the control information, and render the target virtual scene based on the perspective of the controlled virtual object in the target virtual scene to obtain a first video frame without rendering by the first terminal. The rendering efficiency is improved. The second server may directly perform subsequent processing on the first video frame.

For example, the first terminal displays the target virtual scene. The controlled virtual object is displayed in the target virtual scene. A long connection is established between the first terminal and the first server. In response to an operation on the controlled virtual object, the first terminal transmits control information corresponding to the operation to the first server. The long connection means that a plurality of data packets may be transmitted continuously on one connection. During a connection maintenance period, if there is no data packet to transmit, the first terminal and the first server need to transmit a link detection packet. In some embodiments, the operation on the controlled virtual object includes a click operation and a drag operation. The click operation is a click operation on an operation control, such as a click operation on a fire control in the FPS game. The drag operation is a drag operation on the operation control, on the controlled virtual object, or the like, such as a drag operation on a skill control and the like in the MOBA game. After receiving the control information, the first server determines a position, a posture, and an action of the controlled virtual object in the target virtual scene based on the control information. The first server determines the perspective of the controlled virtual object based on the position, the posture, and the action of the controlled virtual object in the target virtual scene. The first server renders the target virtual scene based on the perspective of the controlled virtual object to obtain a first video frame corresponding to the first terminal. The first video frame is a video frame rendered based on the control information transmitted by the first terminal. For example, if the operation on the controlled virtual object by the user is a click-to-squat control, then the control information transmitted by the first terminal to the first server is also used for controlling the controlled virtual object to squat. The first server controls the controlled virtual object to squat in the target virtual scene, and determines a perspective of the controlled virtual object after squatting. The target virtual scene is rendered based on the perspective of the controlled virtual object after squatting to obtain the first video frame. The first server transmits the first video frame to the second server. The second server acquires the first video frame.

302: The second server performs image recognition on the first video frame, and determines a type of the first video frame.

In some embodiments, the second server performs detection in the first video frame by using a template image of the target virtual object. In response to detecting that there is a region that matches the template image of the target virtual object in the first video frame, and the second server determines the first video frame as a first type. The first type indicates that the first video frame displays the target virtual object. In response to detecting that there is no region that matches the template image of the target virtual object in the first video frame, the second server determines the first video frame as a second type. The second type indicates that the first video frame does not display the target virtual object. An identifier of the target virtual object is transmitted to the second server by the client server at the beginning. The second server may determine, based on the identifier of the target virtual object, the target virtual object that needs to be recognized. For example, the second server performs query the template image stored correspondingly to the identifier based on the identifier of the target virtual object, that is, the template image of the target virtual object. After that, the template image is used for performing detection when the video frame corresponding to the first terminal is acquired each time.

The target virtual object is a virtual object set by the first terminal. The target virtual object is any virtual object in the target virtual scene. For example, the target virtual object is a virtual car in the target virtual scene, or the target virtual object is a virtual tree in the target virtual scene, or the target virtual object is a virtual house in a virtual scene, or the target virtual object is a virtual gun, or the like. No limits are made thereto in the embodiments of the disclosure.

In some embodiments, the second server may determine the type of the first video frame by means of template matching, that is, determine whether there is a target virtual object displayed in the first video frame. Since a template matching speed is relatively high, the efficiency is relatively high when the type of the first video frame is determined by means of template matching.

The above embodiment is described below by means of two examples.

Example 1, the second server acquires the similarities between the template image of the target virtual object and a plurality of regions in the first video frame by using the template image of the target virtual object. In a case that there is a region having the similarity that satisfies a target similarity condition with the template image of the target virtual object in the plurality of regions, the second server determines that the region matches the template image of the target virtual object, and determines the first video frame as the first type. In a case that the similarities between the plurality of regions and the template image of the target virtual object do not satisfy the target similarity condition, the second server determines that there is no region that matches the template image of the target virtual object in the first video frame, and determines the first video frame as the second type.

For example, the second server acquires the similarities between the template image of the target virtual object and a plurality of regions on the first video frame by sliding the template image of the target virtual object on the first video frame. The plurality of regions are regions covered when the template image of the target virtual object slides on the first video frame. In some embodiments, the second server may determine the similarities between the template image of the target virtual object and the plurality of regions by using a color value similarity or a gray value similarity. No limits are made thereto in the embodiments of the disclosure. In a case that there is a region having a similarity greater than or equal to a similarity threshold value with the template image of the target virtual object in a plurality of regions, the second server determines that the region matches the template image of the target virtual object, and determines the first video frame as the first type, that is, the first video frame displays the target virtual object. In a case that the similarities between the plurality of regions and the template image of the target virtual object are less than the similarity threshold value, the second server determines that there is no region that matches the template image of the target virtual object in the first video frame, and determines the first video frame as the second type, that is, the first video frame does not display the target virtual object.

Example 2, the second server performs scaling processing on the template image of the target virtual object to obtain template images of a plurality of sizes of the target virtual object. The second server acquires the similarities between the template image of the target virtual object and a plurality of regions on the first video frame based on the template images with the plurality of sizes. The plurality of regions include regions with different sizes. In a case that there is a region having the similarity that satisfies a target similarity condition with the template image of the target virtual object in the plurality of regions, the second server determines that the region matches the template image of the target virtual object, and determines the first video frame as the first type. In a case that the similarities between the plurality of regions and the template image of the target virtual object do not satisfy the target similarity condition, the second server determines that there is no region that matches the template image of the target virtual object in the first video frame, and determines the first video frame as the second type.

Since the controlled virtual object will move in the target virtual scene, a distance between the controlled virtual object and the target virtual object may be different in different video frames, and then the size of the target virtual object may also be different in different video frames. The template image of the target virtual object is scaled into template images with the plurality of sizes to perform template matching, which may improve the accuracy of the template matching.

For example, the second server performs scaling processing on the template image of the target virtual object to obtain the template images with the plurality of sizes of the target virtual object. The second server controls the template images with the plurality of sizes to slide on the first video frame to acquire the similarities between the template images with the plurality of sizes and the plurality of regions on the first video frame. The plurality of regions are regions covered when the template image of the target virtual object slides on the first video frame. In some embodiments, the second server may determine the similarities between the template images with the plurality of sizes and the plurality of regions by using a color value similarity or a gray value similarity. No limits are made thereto in the embodiments of the disclosure. In a case that there is a region having a similarity greater than or equal to the similarity threshold value between any two of the template images with the plurality of sizes in the plurality of regions, the second server determines that the region matches the template image of the target virtual object, and determines the first video frame as the first type, that is, the first video frame displays the target virtual object. In a case that the similarities between the plurality of regions and the template image of the target virtual object are less than the similarity threshold value, the second server determines that there is no region that matches the template image of the target virtual object in the first video frame, and determines the first video frame as the second type, that is, the first video frame does not display the target virtual object.

In some embodiments, the second server inputs the first video frame into an image recognition model. The second server performs feature extraction and classification on the first video frame through the image recognition model, and outputs the type of the first video frame.

The image recognition model is obtained by training based on a sample video frame set. The sample video frame set includes a positive sample video frame and a negative sample video frame. The positive sample video frame is a video frame displaying a target virtual object, and the negative sample video frame is a video frame not displaying a target virtual object. The image recognition model trained by the sample video frame set has the capability to judge whether there is a target virtual object in the video frame. In some embodiments, the image recognition model is trained in advance by the second server. The type of the video frame may be directly determined by using the image recognition model during gaming.

The above implementation is described below by means of two examples.

Example 1, the second server inputs the first video frame into the image recognition model. The second server performs feature extraction and full connection processing on the first video frame through the image recognition model to obtain a probability corresponding to the first video frame. The probability is a probability that the first video frame displays the target virtual object. In response to the probability being greater than or equal to a probability threshold value, the second server determines the first video frame as a first type. The first type indicates that the first video frame displays the target virtual object. In response to the probability being less than the probability threshold value, the second server determines the first video frame as a second type. The second type indicates that the first video frame does not display the target virtual object.

For example, the second server inputs the first video frame into the image recognition model, and performs convolution processing on the first video frame through the image recognition model to obtain a feature map of the first video frame. The second server performs full connection processing and normalization processing on the feature map of the first video frame through the image recognition model to obtain a probability distribution column corresponding to the first video frame. The normalization processing may be performed by using an S-shaped growth curve (Sigmoid) or a soft Softmax function. No limits are made thereto in the embodiments of the disclosure. In response to the probability corresponding to the first type in the probability distribution column being greater than or equal to the probability threshold value, the second server determines the first video frame as the first type, that is, the first video frame displays the target virtual object. In response to the probability corresponding to the second type in the probability distribution column being greater than or equal to the probability threshold value, the second server determines the first video frame as the second type, that is, the first video frame does not display the target virtual object.

Example 2, the second server divides the first video frame into a plurality of image blocks, and inputs the plurality of image blocks into the image recognition model. The second server performs feature extraction and full connection processing on the plurality of image blocks through the image recognition model to obtain a plurality of probabilities respectively corresponding to the plurality of image blocks. The probabilities are the probabilities that corresponding image blocks include the target virtual object. In response to any of the plurality of probabilities being greater than or equal to a probability threshold value, the second server determines the first video frame as the first type. The first type indicates that the first video frame displays the target virtual object. In response to each of the plurality of probabilities being less than the probability threshold value, the second server determines the first video frame as the second type. The second type indicates that the first video frame does not display the target virtual object.

For example, the second server divides the first video frame into a plurality of image blocks with the same size, inputs the plurality of image blocks into the image recognition model, and performs convolution processing on the plurality of image blocks through the image recognition model to obtain feature maps of the plurality of image blocks. The second server performs full connection processing and normalization processing on the feature maps of the plurality of image blocks through the image recognition model to obtain a plurality of probabilities corresponding to the plurality of image blocks. The probabilities are the probabilities that the corresponding image blocks display the target virtual object. The normalization processing may be performed by using an S-shaped growth curve (Sigmoid) or a soft Softmax function. No limits are made thereto in the embodiments of the disclosure. In response to any of the probabilities being greater than or equal to the probability threshold value, the second server determines the first video frame as the first type, that is, the first video frame displays the target virtual object. In response to each of the plurality of probabilities being less than the probability threshold value, the second server determines the first video frame as the second type, that is, the first video frame does not display the target virtual object.

After operation 302, the second server performs the following operation 303 in a case that the type indicates that the first video frame displays the target virtual object; and the second server performs the following operation 304 in a case that the type indicates that the first video frame does not display the target virtual object.

303: The second server renders the target virtual object in the first video frame based on the first parameter of the first terminal to obtain a second video frame in a case that the type indicates that the first video frame displays the target virtual object of the first terminal.

In some embodiments, the second server acquires a first rendering parameter in a case that the first video frame displays the target virtual object of the first terminal. The first rendering parameter is a rendering parameter corresponding to a first angle and a first distance in the first parameter, the first angle being an angle between the controlled virtual object and the target virtual object, and the first distance being a distance between the controlled virtual object and the target virtual object. The second server renders the target virtual object in the first video frame based on the first rendering parameter to obtain the second video frame.

In some embodiments, the second server may perform secondary rendering on the target virtual object based on the first rendering parameter to change the display effect of the target virtual object in a case that the first video frame displays the target virtual object. During gaming, the distance and angle between the controlled virtual object and the target virtual object may change at any time. Different distances and angles correspond to different rendering parameters. The second server may directly acquire the first rendering parameter from the first parameter based on the first angle and the first distance without acquiring the first rendering parameter by performing a secondary operation based on the first angle and the first distance, which is high in efficiency.

For example, the second server acquires the first angle and the first distance between the controlled virtual object and the target virtual object from the first server in a case that the first video frame displays the target virtual object of the first terminal. The second server transmits the first angle, the first distance, and an identifier of the target virtual object to the client server. After receiving the first angle, the first distance, and the identifier of the target virtual object, the client server determines a first parameter based on the identifier of the target virtual object. The client server performs query in the first parameter based on the first angle and the first distance to obtain the first rendering parameter, and transmits the first rendering parameter to the second server. The second server determines target pixel values of a plurality of target pixel points of the target virtual object in the first video frame based on the first rendering parameter. The second server updates the pixel values of the plurality of target pixel points in the first video frame by using the target pixel values to obtain the second video frame.

The target pixel points refer to pixel points of the target virtual object in the first video frame. The target pixel points have pixel values in the first video frame. The target pixel values refer to the pixel values that need to be obtained by updating the target pixel points. Therefore, original pixel values of the target pixel values are updated by using the target pixel values.

The angle between the controlled virtual object and the target virtual object may be the angle between an orientation of the controlled virtual object and an orientation of the target virtual object. For example, if the controlled virtual object is a game character holding a virtual gun in a game scene, then the orientation of the controlled virtual object is an aiming direction of the virtual gun. If the target virtual object is a virtual car, then the orientation of the target virtual object is also right ahead the virtual car. The distance between the controlled virtual object and the target virtual object is the distance between a center point of the controlled virtual object and a center point of the target virtual object.

In some embodiments, the second server acquires the first rendering parameter and the second rendering parameter from the first parameter in a case that the first video frame displays the target virtual object of the first terminal. The second server respectively renders the target virtual object and the controlled virtual object in the first video frame by using the first rendering parameter and the second rendering parameter to obtain the second video frame.

In some embodiments, since the first parameter is a parameter of the first terminal, the first parameter carries both the first rendering parameter for rendering the target virtual object and the second rendering parameter for rendering the controlled virtual object, which indicates that the user may not only perform secondary rendering on the target virtual object in the virtual scene, but also perform secondary rendering on the controlled virtual object controlled by the first terminal, which improves the personalization and playability.

For example, the second server acquires the first angle and the first distance between the controlled virtual object and the target virtual object from the first server in a case that the first video frame displays the target virtual object of the first terminal. The second server transmits the first angle, the first distance, and an identifier of the target virtual object to the client server. After receiving the first angle, the first distance, and the identifier of the target virtual object, the client server determines a first parameter based on the identifier of the target virtual object. The client server performs query in the first parameter based on the first angle and the first distance to obtain the first rendering parameter and the second rendering parameter, and transmits the first rendering parameter and the second rendering parameter to the second server.

After receiving the first rendering parameter and the second rendering parameter, in the first video frame, the second server renders the target virtual object by using the first rendering parameter, and renders the controlled virtual object by using the second rendering parameter to obtain a second video frame.

For example, if the user wants to personalize a display effect of the target virtual object and also wants to personalize a display effect of the controlled virtual object controlled by the user when displaying the target virtual object, this may be implemented by the above implementation. Taking the target virtual object being a virtual car as an example, if the user wants to set the color of the virtual car to red, and also wants to be able to display the clothing of the game character (the virtual object) controlled by the first terminal as blue when the virtual car appears in the target virtual scene, then the first rendering parameter and the second rendering parameter may be configured in the first parameter by the above implementation. When the first video frame displays the target virtual object, the second server may perform secondary rendering on the controlled virtual object by using the first rendering parameter while performing secondary rendering on the target virtual object by using the first rendering parameter, which improves the personalization.

In some embodiments, the second server determines the position of the controlled virtual object in the target virtual scene in a case that the first video frame displays the target virtual object of the first terminal. The second server renders the target virtual object in the first video frame based on the first parameter to obtain the second video frame in a case that the controlled virtual object is located in a target sub-scene of the target virtual scene. The second server determines the first video frame as the second video frame in a case that the controlled virtual object is not located in the target sub-scene of the target virtual scene.

The target virtual scene includes a plurality of sub-scenes, and the plurality of sub-scenes constitute the target virtual scene. For example, the plurality of sub-scenes are divided into a virtual social scene and a virtual battle scene. The virtual social scene includes a virtual fishing scene, a virtual chat room, a virtual dance room, or a virtual chess and card room. In the virtual social scene, the user communicates with other users by controlling a virtual object. The virtual battle scene is a scene in which the user controls the virtual object to battle. The target sub-scene is determined by the first terminal, and may be either the virtual social scene or the virtual battle scene. No limits are made thereto in the embodiments of the disclosure.

In the above implementation, the user may determine both the first parameter and the target sub-scene for rendering the target virtual object through the first terminal, which greatly improves the personalization degree and improves the user viscosity.

For example, the second server acquires the position of the controlled virtual object in the target virtual scene from the first server in a case that the first video frame displays the target virtual object of the first terminal. That is, the second server transmits a position acquisition request to the first server. The position acquisition request carries a time stamp of the first video frame and the identifier of the controlled virtual object. After acquiring the position acquisition request, the first server acquires the time stamp of the first video frame and the identifier of the controlled virtual object from the position acquisition request, and performs query based on the time stamp of the first video frame and the identifier of the controlled virtual object to obtain the position of the controlled virtual object in the target virtual scene at a time point indicated by the time stamp of the first video frame. The first server transmits the position of the controlled virtual object in the target virtual scene. The position is used for indicating a sub-scene in which the controlled virtual object is located in the target virtual scene. The second server transmits a parameter acquisition request to the client server while transmitting a position acquisition request to the first server. The parameter acquisition request carries the identifier of the target virtual object. After receiving the parameter acquisition request, the client server acquires the identifier of the target virtual object from the parameter acquisition request. The client server performs query based on the identifier of the target virtual object to obtain the first parameter corresponding to the target virtual object and the identifier of the target sub-scene, and transmits the first parameter and the identifier of the target sub-scene to the second server. The second server acquires the position transmitted by the first server, the first parameter transmitted by the client server, and the identifier of the target sub-scene. The second server renders the target virtual object in the first video frame by using the first parameter to obtain the second video frame in a case that the sub-scene indicated by the position is the target sub-scene. The second server does not render the first video frame, and directly determines the first video frame as the second video frame in a case that the sub-scene indicated by the position is not a target sub-scene, that is to say, the second server may directly transmit the first video frame to the first terminal, and the first terminal displays the first video frame.

For example, the target sub-scene is a virtual fishing scene, and the target virtual object is a virtual car. When it is determined that the first video frame displays the virtual car and simultaneously the controlled virtual object is located in the virtual fishing scene, the second server may perform secondary rendering on the virtual car by using the first parameter to change the display effect of the virtual car. When the second server determines that the first video frame displays the virtual car, but the controlled virtual object is not located in the virtual fishing scene, the first video frame is directly determined as a second video frame without using the first rendering parameter to perform secondary rendering on the first video frame.

In operation 302 above, the second server, in addition to determining the type of the first video frame, may also determine the position of the target virtual object in the first video frame in a case that the first video frame is of the first type. If the second server determines the type of the first video frame by a template matching method, then a scene server may determine the region that matches the template image of the target virtual object in the first video frame as the position of the target virtual object in the first video frame. If the second server determines the type of the first video frame by using the image recognition model, then the image recognition model may output a detection box in the first video frame. The detection box is also the position where the target virtual object is located in the first video frame. After determining the position of the target virtual object in the first video frame, the second server may perform secondary rendering on the position of the target virtual object in the first video frame based on the first rendering parameter to obtain a second video frame.

For example, the second server transmits a relative position acquisition request to the first server in a case that the first video frame displays the target virtual object of the first terminal. The relative position acquisition request is used for acquiring the distance between the controlled virtual object and the target virtual object. The relative position acquisition request carries the identifier of the controlled virtual object and the identifier of the target virtual object. After receiving the relative position acquisition request, the first server acquires the identifier of the controlled virtual object and the identifier of the target virtual object from the relative position acquisition request, and determines the first angle and the first distance between the controlled virtual object and the target virtual object based on the identifier of the controlled virtual object and the identifier of the target virtual object. The first server transmits the first angle and the first distance between the controlled virtual object and the target virtual object to the second server. After receiving the first angle and the first distance between the controlled virtual object and the target virtual object, the second server transmits a rendering parameter acquisition request to the client server. The rendering parameter acquisition request carries the first angle, the first distance, and the identifier of the target virtual object. After receiving the rendering parameter acquisition request, the client server acquires the first angle, the first distance, and the identifier of the target virtual object from the rendering parameter acquisition request, and determines the first parameter based on the identifier of the target virtual object. The client server performs query in the first parameter based on the first angle and the first distance to obtain the first rendering parameter, and transmits the first rendering parameter to the second server. The second server determines target pixel values of a plurality of target pixel points of the target virtual object in the first video frame based on the first rendering parameter. The second server updates the pixel values of the plurality of target pixel points in the first video frame by using the target pixel values to obtain the second video frame, that is, replaces the pixel values of the plurality of target pixel points by using the target pixel values. In some embodiments, the target pixel values are also referred to as texture data.

Figure 4:
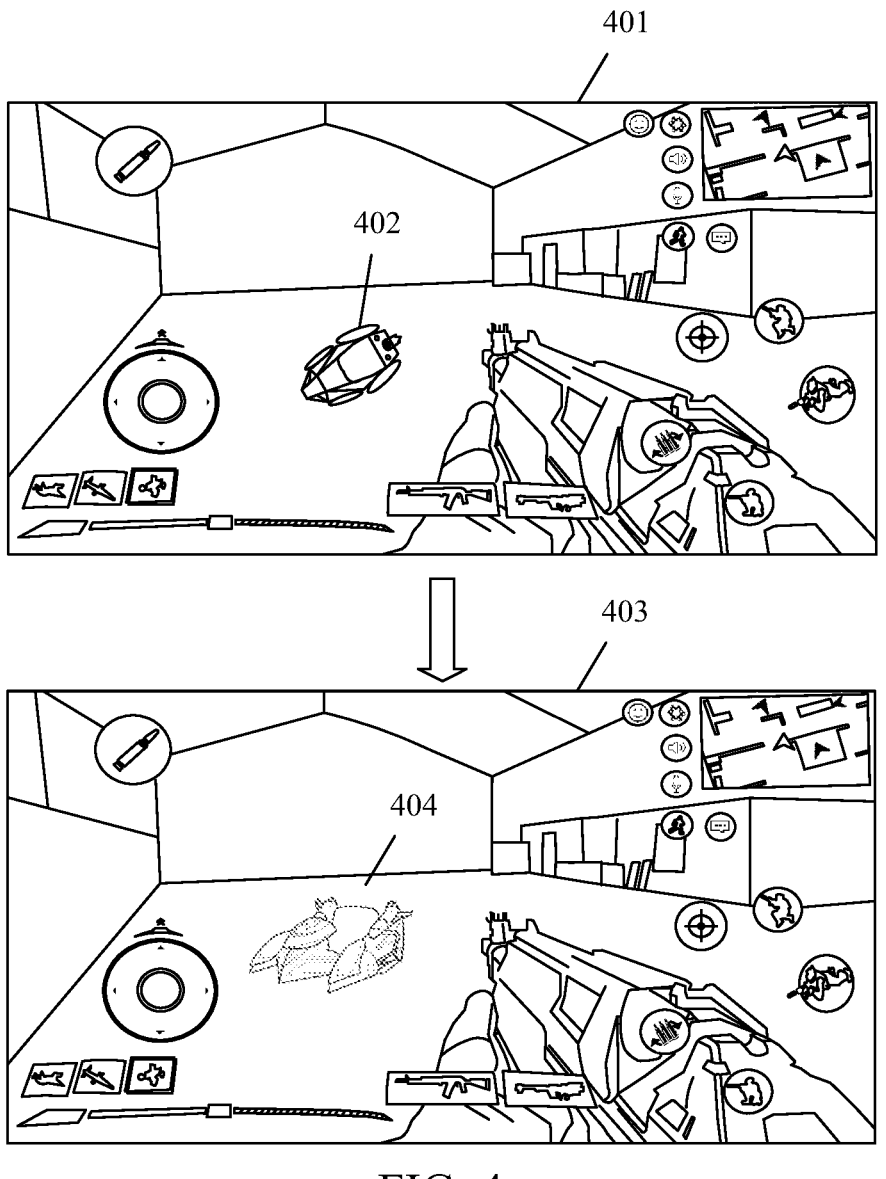
FIG. 4 is a schematic diagram of an interface according to some embodiments.

With reference to FIG. 4, the first server renders the target virtual scene from the perspective of the controlled virtual object in the target virtual scene to obtain a first video frame 401. The first video frame 401 includes a virtual car 402. The virtual car 402 is also a target virtual object. The second server performs secondary rendering on the virtual car 402 by using the first rendering parameter to obtain a second video frame 403. It may be seen that the virtual car 404 in the second video frame 403 has a different display effect from that in the first video frame 401.

In some embodiments, there is an Android container in the first server. A rendering technology of the Android container uses a technology of rendering inside the Android container. The principle thereof is that a graphics processing unit (GPU) may be directly accessed inside the Android container. The GPU has high concurrent computing power, and may complete rendering directly inside the Android container. The rendering performance may be improved, and the delay caused by excessive rendering is greatly reduced. One Android container is one complete Android system, which also has perfect compatibility, and may realize rendering of games. When a game starts, the first server may transmit rendering-completed instructions to the client server. The client server may record game duration information of a current user account in real time. If the duration is insufficient, the client server may notify a client to process through signaling (for example, when the duration is insufficient, a box pops up to prompt that the duration is not used. When a cloud game is abnormal, the client pops up a box to prompt the user for an abnormality), and the like.

A method for a client server to generate a first parameter of a target virtual object is described below.

In some embodiments, the first terminal displays a configuration interface of the target virtual object. The configuration interface is used for acquiring configuration information of the target virtual object. The configuration information of the target virtual object is transmitted to the client server in response to an operation on the configuration interface. The client server receives the configuration information of the target virtual object, creates a three-dimensional model of the target virtual object based on the configuration information of the target virtual object, and acquires a first parameter corresponding to the three-dimensional model. In some embodiments, the client server may bind and store the user account (User ID) logged in by the first terminal, an identifier of the target virtual scene (Game ID), an identifier of the target virtual object (Object ID), and the first parameter, so that the first parameter may be determined based on the representation in a subsequent calling process, which is high in efficiency.

For example, the first terminal displays a configuration interface of a target cloud game. The configuration interface displays a plurality of virtual objects in the target cloud game. The target cloud game is a cloud game selected by the user. The game scene of the target cloud game is also a target virtual scene. In response to the target virtual object of the plurality of virtual objects being selected, the first terminal displays a configuration interface of the target virtual object. The configuration interface displays a plurality of configuration options. The first terminal generates the configuration information of the target virtual object based on a selected option of the plurality of configuration options, and transmits the configuration information of the target virtual object to the client server. After receiving the configuration information of the target virtual object, the client server renders an initial three-dimensional model of the target virtual object based on the configuration information of the target virtual object to obtain the three-dimensional model of the target virtual object. The client server acquires rendering parameters of the virtual camera and the three-dimensional model of the target virtual object at different angles and different distances. The rendering parameters at different angles and different distances constitute a first parameter corresponding to the three-dimensional model.

Figure 5:
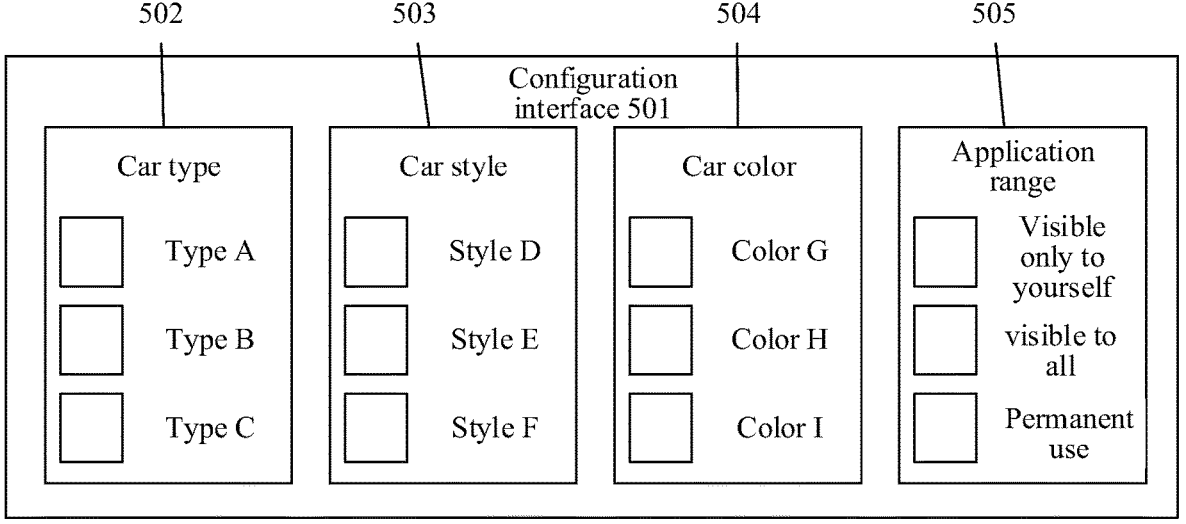
FIG. 5 is a schematic diagram of an interface according to some embodiments.

For example, a first terminal starts a cloud game client, and displays a running interface of the cloud game client. The running interface displays a plurality of cloud games to be selected. In response to the target cloud game of the plurality of cloud games being selected, the first terminal displays a configuration interface of the target cloud game. The configuration interface displays a plurality of virtual objects that may be subjected to personalization processing in the target cloud game, for example, the plurality of virtual objects include a virtual car, a virtual tree, a virtual house, and the like. In response to the target virtual object of the plurality of virtual objects being selected, taking the target virtual object being the virtual car as an example, referring to FIG. 5, the first terminal displays a configuration interface 501 of the virtual car. The configuration interface 501 displays a plurality of first-level configuration options 502. The first-level configuration options are used for selecting a type of the virtual car. In some embodiments, the first terminal represents the type of the virtual car by using a brand of a car. In response to any one of the plurality of first-level configuration options being selected, the first terminal displays a plurality of second-level configuration options 503 corresponding to the first-level configuration options. The second-level configuration options are used for selecting a style of the virtual car. In some embodiments, the first terminal represents the style of the virtual car by using a model of a car. In response to any one of the plurality of secondary configuration options being selected, the first terminal displays a plurality of third-level configuration options 504 corresponding to the second-level configuration options. The third-level configuration options are used for selecting the color of the virtual car, such as red, black, blue, and the like. In some embodiments, in response to any one of a plurality of three-level configuration options being selected, the first terminal displays a plurality of four-level configuration options 505. The four-level configuration options are used for selecting an application range of the configuration information of the target virtual object. The application range includes "visible only to yourself", "visible to all", "permanent use", and "single use". The "visible only to yourself" is used for instructing the second server to perform secondary rendering only on a video frame corresponding to the first terminal and not to perform secondary rendering on video frames corresponding to other terminals during gaming. The "visible to all" is used for indicating that the second server performs secondary rendering on the video frames corresponding to all terminals during gaming. For example, the virtual car in the target virtual scene is displayed as type A-style B-red by default. The user of the first terminal sets the virtual car as type C-style D-white through the configuration interface of the virtual car. If the user of the first terminal selects the "visible only to yourself", the virtual car is displayed as type C-style D-white in the target virtual scene displayed by the first terminal during gaming. While for other terminals displaying the target virtual scene, the virtual car is also displayed as type A-style B-red. Of course, if the user of the first terminal selects the "visible to all". All terminals displaying the target virtual scene will display the virtual car as type C-style D-white during gaming. For the option "permanent use", the second server determines rendering parameters each time according to the configuration information determined this time. For the option "single use", the second server will only determine rendering parameters according to the configuration information determined this time in this gaming process. The first terminal determines a setting parameter of the target virtual object based on the above first-level configuration option, second-level configuration option, third-level configuration option, and fourth-level configuration option, and transmits the setting parameter to the client server. The client server creates a three-dimensional model of the target virtual object by means of an open graphics library (OpenGL) based on the setting parameter of the target virtual object. The client server acquires rendering parameters of the virtual camera and the three-dimensional model of the target virtual object at different angles and different distances. The rendering parameters at different angles and different distances constitute a first parameter corresponding to the three-dimensional model.

In some embodiments, taking the target virtual scene including a virtual car as an example, a technician may create a large number of three-dimensional models of virtual cars in advance based on basic information (CarType, CarStyle, CarCalor, and the like) of the car through the client server, so that the corresponding three-dimensional model may be directly called during gaming, which is high in efficiency.

After acquiring the second video frame, the second server may also perform the following operations.

In some embodiments, the second server acquires a second animation and second audio corresponding to the target virtual object. The second server adds the second animation corresponding to the target virtual object in the second video frame to obtain a seventh video frame. The second server transmits the seventh video frame and the second audio to the first terminal. The first terminal plays the second audio while displaying the seventh video frame. The position where the second animation is added to the second video frame is determined by a user or a technician. For example, the second animation is added to a position adjacent to the target virtual object, such as above or beside the target virtual object. No limits are made thereto in the embodiments of the disclosure.

In some embodiments, after performing secondary rendering on the first video frame based on the first parameter to obtain the second video frame, the second server may also perform further rendering on the basis of the second video frame, that is, add a second animation corresponding to the target virtual object to the second video frame to obtain the seventh video frame. In addition, the second audio corresponding to the target virtual object is also acquired, and after the seventh video frame and the second audio are simultaneously transmitted to the first terminal, the first terminal may play the second audio while displaying the seventh video frame. Since the first parameter, the second animation, and the second audio are all determined by the user through the first terminal, the same first video frame may be rendered into different seventh video frames by the second server due to different settings, and different second audio is configured, so that personalization is improved.

For example, the second server acquires the second animation and the second audio corresponding to the target virtual object from the client server. Both the second animation and the second audio are determined by the first terminal. That is, the second server transmits a first animation acquisition request to the client server. The first animation acquisition request carries the identifier of the target virtual object. After receiving the first animation acquisition request, the client server acquires the identifier of the target virtual object from the first animation acquisition request, performs query based on the identification of the target virtual object, acquires the second animation and the second audio corresponding to the target virtual object, and transmits the second animation and the second audio to the second server. After receiving the second animation and the second audio, the second server adds the second animation to the second video frame, for example, adding a first frame of the second animation to the second video frame to obtain the seventh video frame. The second server transmits the seventh video frame and the second audio to the first terminal. The first terminal receives the seventh video frame and the second audio, and plays the second audio while displaying the seventh video frame.

From a perspective of the user, if the target virtual object is a virtual car, the second animation is a thumb gradually appearing, and the first parameter is to adjust the virtual car to red. Then, in the seventh video frame displayed by the first terminal, the color of the virtual car is red, the thumb is displayed beside the virtual car, and simultaneously, the second audio is played.

304: The second server transmits the first video frame to the first terminal in a case that the type indicates that the first video frame does not display the target virtual object of the first terminal, the first terminal being configured to display the first video frame.

Through operation 304, when the first video frame does not display the target virtual object, the second server does not need to perform secondary rendering on the first video frame and directly forwards the first video frame to the first terminal, and the first terminal displays the first video frame.

305: The second server transmits the second video frame to the first terminal, the first terminal being configured to display the second video frame.

Through operation 305, in a case that the first video frame displays the target virtual object, the second server performs secondary rendering on the first video frame based on the first rendering parameter to obtain a second video frame, and transmits the second video frame to the first terminal. The target virtual object in the second video frame displayed on the first terminal is displayed with a display effect configured by the first terminal, so as to realize quick adjustment of the display effect of the target virtual object.

After transmitting the second video frame to the first terminal, the second server may also perform any one of the following operations.

In some embodiments, the second server aggregates a plurality of the second video frames into a first video frame set, and transmits the first video frame set to the first terminal, the first terminal being configured to share the first video frame set with other terminals.

In some embodiments, since the second video frame is a video frame obtained by performing secondary rendering by the second server based on user settings, then the display effect of the second video frame is also personalized. The second server may aggregate the second video frames into the first video frame set, and transmit the first video frame set to the first terminal. The first terminal may share the first video frame set with other terminals, that is, the user shares his/her personalization for the cloud application with other users to stimulate other users to play the cloud application, so that the cloud application is propagated more widely.

In some embodiments, after acquiring the first video frame set, the first terminal may share the first video frame set through a social network, so that the first video frame set is propagated more widely.

In some embodiments, the second server concatenates the second video frame with the first video frame to obtain a concatenated video frame. The second server aggregates a plurality of the concatenated video frames into a second video frame set, and transmits the second video frame set to the first terminal. The first terminal is configured to share the second video frame set with other terminals.

In some embodiments, the second video frame is a video frame obtained by performing secondary rendering by the second server based on user settings. The first video frame is a video frame rendered by the first server by default. The user may see the personalization of the user more clearly by viewing the concatenated video frame after the second video frame and the first video frame are concatenated into the concatenated video frame. The second server may aggregate the concatenated video frames into one second video frame set, and transmit the second video frame set to the first terminal. The first terminal may share the second video frame set with other terminals, that is, share his/her personalization for a cloud application with other users to stimulate other users to play the cloud application, so that the cloud application is propagated more widely.

In the above operations 301 to 305, taking an example in which the second server performs processing on the first video frame to obtain the second video frame as an example for description. During gaming, the first server performs real-time rendering on the target scene to obtain a series of video frames. The series of video frames are all video frames corresponding to the first terminal. The first video frame is one video frame in the series of video frames. For each of the series of video frames, the second server may perform the operations 301 to 305 above.

If the first terminal selects the "visible to all", the second server may also perform the following operations 306 to 308, so that the second server performs secondary rendering on video frames corresponding to other terminals to change the display effect of the target virtual object in the virtual scene.

306: The second server acquires a fifth video frame corresponding to the second terminal, the fifth video frame being a video frame obtained by rendering the target virtual scene from a perspective of a second virtual object.

A method for the second server to acquire the fifth video frame corresponding to the second terminal may be similar to the method for the second server to acquire the first video frame corresponding to the first terminal. An implementation process refers to the relevant description of the above operation 301, which will not be described in detail here.

307: The second server performs target processing on the fifth video frame to obtain a sixth video frame in a case that the fifth video frame displays the target virtual object.

A method for the second server to determine whether the fifth video frame displays the target virtual object may be similar to the method for the second server to determine whether the first video frame displays the target virtual object. An implementation process may refer to the relevant description of the above operation 302, which will not be described in detail here.

In some embodiments, the second server renders the target virtual object in the fifth video frame based on a second parameter of the second terminal to obtain the sixth video frame in a case that the fifth video frame displays the target virtual object. The second parameter may be determined by the second terminal.

In this case, if the second terminal sets the second parameter for the target virtual object, then the second server may render the target virtual object in the fifth video frame by using the second parameter to obtain the sixth video frame, and subsequently may transmit the sixth video frame to the second terminal for displaying by the second terminal. That is, the second server may perform secondary rendering on the video frame including the target virtual object by using the first parameter, and transmit the video frame after the secondary rendering to the first terminal. The second server performs secondary rendering on the video frame including the target virtual object by using the second parameter, and transmit the video frame after the secondary rendering to the second terminal. The target virtual object may have different display effects in the video frames displayed on the first terminal and the second terminal. For example, taking the target virtual object being a virtual car as an example, if the first parameter indicates that the virtual car is rendered in red, and the second parameter indicates that the virtual car is rendered in blue, then the virtual car is red in the video frame displayed by the first terminal, and the virtual car is rendered in blue in the video frame displayed by the second terminal.

For example, if the second terminal determines the second parameter for the target virtual object, the second server acquires a second angle and a second distance between the second virtual object and the target virtual object from the first server in a case that the fifth video frame displays the target virtual object. The second server transmits the second angle, the second distance, and the identifier of the target virtual object to the client server. After receiving the second angle, the second distance, and the identifier of the target virtual object, the client server determines the second parameter based on the identifier of the target virtual object. The client server performs query in the second parameter based on the second angle and the second distance to obtain a third rendering parameter, and transmits the third rendering parameter to the second server. After receiving the third rendering parameter, in the fifth video frame, the second server renders the target virtual object by using the third rendering parameter to obtain a sixth video frame.

In some embodiments, the second server renders the target virtual object in the fifth video frame based on the first parameter to obtain the sixth video frame in a case that the fifth video frame displays the target virtual object.

In this case, if the second terminal does not set the second parameter for the target virtual object, then the second server may render the target virtual object in the fifth video frame by using the first parameter to obtain the sixth video frame, and subsequently may transmit the sixth video frame to the second terminal for displaying by the second terminal. That is, the target virtual object has the same display effect in the video frames displayed on the first terminal and the second terminal.

For example, if the second terminal does not determine the second parameter for the target virtual object, the server acquires the second angle and the second distance between the second virtual object and the target virtual object from the first server in a case that the fifth video frame displays the target virtual object. The second server transmits the second angle, the second distance, and the identifier of the target virtual object to the client server. After receiving the second angle, the second distance, and the identifier of the target virtual object, the client server determines the first parameter based on the identifier of the target virtual object. The client server performs query in the first parameter based on the second angle and the second distance to obtain a third rendering parameter, and transmits the third rendering parameter to the second server. After receiving the third rendering parameter, in the fifth video frame, the second server renders the target virtual object by using the third rendering parameter to obtain a sixth video frame.

In some embodiments, the second server adds a second animation corresponding to the target virtual object to the fifth video frame to obtain the sixth video frame in a case that the fifth video frame displays the target virtual object.

In some embodiments, the second server may add a second animation corresponding to the target virtual object to the fifth video frame, so that the personalization is improved.

In some embodiments, the controlled virtual object and the second virtual object are simultaneously located in a target sub-scene of the target virtual scene, and the second server compares virtual levels of the controlled virtual object and the second virtual object in a case that the fifth video frame displays the target virtual object. The second server renders the target virtual object in the fifth video frame based on the first parameter to obtain the sixth video frame in a case that the virtual level of the controlled virtual object is higher than that of the second virtual object. The second server renders the target virtual object in the fifth video frame based on the second parameter of the second terminal to obtain the sixth video frame in a case that the virtual level of the controlled virtual object is lower than that of the second virtual object. The second server renders the target virtual object in the fifth video frame based on the third parameter to obtain the sixth video frame in a case that the virtual levels of the controlled virtual object and the second virtual object are the same. The third parameter may be set by the first server.

The target virtual scene includes a plurality of sub-scenes, and the plurality of sub-scenes constitute the target virtual scene. For example, the plurality of sub-scenes are divided into a virtual social scene and a virtual battle scene. The virtual social scene includes a virtual fishing scene, a virtual chat room, a virtual dance room, or a virtual chess and card room. In the virtual social scene, the user communicates with other users by controlling a virtual object. The virtual battle scene is a scene in which the user controls the virtual object to battle. The target sub-scene is determined by the first terminal, and may be either the virtual social scene or the virtual battle scene. No limits are made thereto in the embodiments of the disclosure. The virtual level is a level of the virtual object in the target virtual scene. The higher the level is, the stronger the battle capability of the virtual object is. Or, the virtual level is a member level of the virtual object corresponding to a game account. The higher the member level is, the more services may be enjoyed in a cloud application.

In some embodiments, when the controlled virtual object and the second virtual object are simultaneously located in the target sub-scene, the second server may determine, based on the virtual levels of the controlled virtual object and the second virtual object, whether to use the first parameter set by the first terminal or the second parameter of the second terminal to perform secondary rendering on the target virtual object, so as to encourage the user to improve the virtual level of the virtual object and improve the game enthusiasm of the user.

For example, the second server transmits a virtual level acquisition request to the client server in a case that the controlled virtual object and the second virtual object are simultaneously located in a target sub-scene of the target virtual scene. The virtual level acquisition request carries the identifier of the controlled virtual object and the identifier of the second virtual object. After acquiring the virtual level acquisition request, the client server acquires the identifier of the controlled virtual object and the identifier of the second virtual object from the virtual level acquisition request, and performs query based on the identifier of the controlled virtual object and the identifier of the second virtual object to obtain a first virtual level of the controlled virtual object and a second virtual level of the second virtual object. The client server transmits the first virtual level of the controlled virtual object and the second virtual level of the second virtual object to the second server. After the second server receives the first virtual level of the controlled virtual object and the second virtual level of the second virtual object, the second server acquires the first parameter from the client server and renders the target virtual object in the fifth video frame by using the first parameter to obtain the sixth video frame in a case that the first virtual level is greater than the second virtual level. The second server acquires the second parameter from the client server and renders the target virtual object in the fifth video frame by using the second parameter to obtain the sixth video frame in a case that the first virtual level is lower than the second virtual level. The second server acquires the third parameter from the client server, and renders the target virtual object in the fifth video frame by using the third parameter to obtain the sixth video frame in a case that the first virtual level is equal to the second virtual level. In some embodiments, the third parameter is determined based on the first virtual level.

308: The second server transmits the sixth video frame to the second terminal, the second terminal being configured to display the sixth video frame.

Some embodiments may be formed by using any combination of all the foregoing optional technical solutions, and details are not described herein.

Some embodiments only take the method performed by the second server as an example. In other embodiments, the method may also be performed by other servers.

Through the technical solutions provided by the embodiments of the disclosure, if it is desired to change a display effect of a certain virtual object, the first parameter may be determined for the virtual object by the first terminal, and the server performs secondary rendering the video frame based on the first parameter to obtain the second video frame. Compared with the first video frame, the display effect of the virtual object displayed in the second video frame is also the display effect configured by the first terminal for the virtual object. Through such technical solutions, a function of performing secondary rendering on the virtual object is provided in a cloud application, and the user may quickly and efficiently adjust the display effect of the certain virtual object in the virtual scene, which extends a functional range of the cloud application and improves the personalization of the cloud application. Therefore, the cloud application is propagated more widely.

Figure 6:
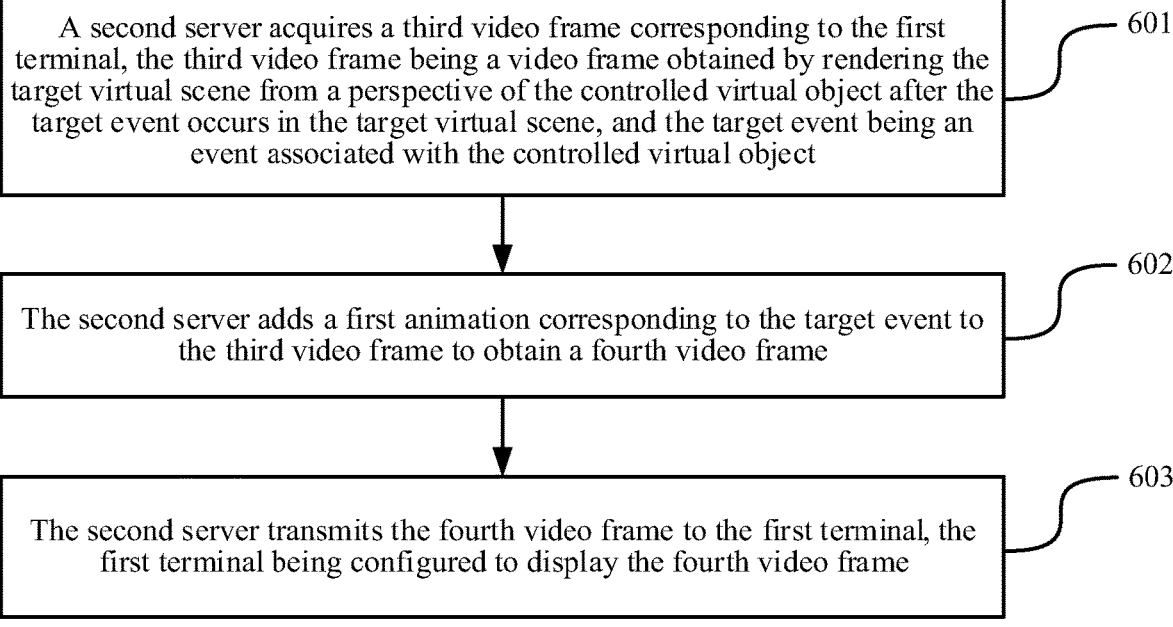
FIG. 6 is a flowchart of a video frame rendering method according to some embodiments.

In addition to the above operations 301 to 308, the embodiments of the disclosure also provide another video frame rendering method. The video frame rendering method is applicable to a case that a target event occurs in a target virtual scene. With reference to FIG. 6, the method includes the following operations:

601: A second server acquires a third video frame corresponding to the first terminal, the third video frame being a video frame obtained by rendering the target virtual scene from a perspective of the controlled virtual object after the target event occurs in the target virtual scene, and the target event being an event associated with the controlled virtual object.

In some embodiments, in response to the target event occurring in the target virtual scene, the first server transmits the third video frame corresponding to the first terminal to the second server. The first server transmits prompt information bound to the third video frame to the second server while transmitting the third video frame to the second server. The prompt information carries an identifier of the target event. The second server may determine that the target event occurs in the target virtual scene based on the prompt information while acquiring the third video frame, so as to trigger subsequent rendering of the third video frame.

For example, the target event is that the controlled virtual object defeats the first virtual object for in the target virtual scene. Defeat here means that a life value of the first virtual object is reduced to 0 by a behavior of the controlled virtual object in the target virtual scene. For example, the controlled virtual object attacks the first virtual object by using a virtual gun/a virtual dagger/a virtual hand grenade, and the like to reduce the life value of the first virtual object to 0. The first virtual object is an object in a different team from the controlled virtual object, or the first virtual object is a virtual object that is hostile to the controlled virtual object. In response to the controlled virtual object defeating the first virtual object in the target virtual scene, the first server transmits the third video frame to the second server in real time. The third video frame is the first video frame after the first virtual object is defeated. The first server transmits prompt information bound to the third video frame while transmitting the third video frame to the second server. The prompt information, in addition to carrying the identifier of the target event, also carries the position where the first virtual object is defeated. Subsequently, the second server, in addition to being able to determine that the controlled virtual object defeats the first virtual object in the target virtual scene based on the prompt information, may also determine a region where the first virtual object is defeated in the third video frame. In some embodiments, in response to the target event occurring in the target virtual scene, the first server may also Hook the target event by using a Hook function, and notify the second server of the target event, that is, notify the second server that the target event occurs in the target virtual scene by means of the prompt information.

The above example is described by means of an example in which the target event is that the controlled virtual object defeats the first virtual object in the target virtual scene. In other possible implementations, the target event may also be that the controlled virtual object picks up a target virtual prop in the target virtual scene, or the controlled virtual object starts a target virtual carrier in the target virtual scene, or the controlled virtual object successively defeat a plurality of virtual objects in the target virtual scene, and the like. The target event is set by a technician according to actual situations. No limits are made thereto in the embodiments of the disclosure.

602: The second server adds a first animation corresponding to the target event to the third video frame to obtain a fourth video frame.

In some embodiments, the target event is that the controlled virtual object defeats the first virtual object in the target virtual scene, and the second server determines a region where the first virtual object is defeated in the third video frame. The second server adds the first animation corresponding to the target event to the region to obtain the fourth video frame. A correspondence between the target event and an animation is set through the first terminal. For example, the target event is selected by the first terminal, and the animation bound to the target event is selected from a plurality of animations provided by the client server, or the first animation corresponding to the target event is uploaded to the client server by the first terminal, and the client server binds the animation to the target event after receiving the animation uploaded by the first terminal.

For example, the first server also transmits the prompt information bound to the third video frame while transmitting the third video frame to the second server. The second server acquires the identifier of the target event and the position where the first virtual object is defeated from the prompt information. The second server determines the first animation corresponding to the target event based on the identifier of the target event, and determines the region where the first virtual object is defeated based on the position where the first virtual object is defeated. The second server adds the first animation corresponding to the target event to the region to obtain the fourth video frame.

For example, the first server also transmits the prompt information bound to the third video frame while transmitting the third video frame to the second server. The second server acquires the identifier of the target event and the position where the first virtual object is defeated from the prompt information. The second server transmits a second animation acquisition request to the client server. The second animation acquisition request carries the identifier of the target event. After receiving the second animation acquisition request, the client server acquires the identifier of the target event from the second animation acquisition request, performs query based on the identifier of the target event to obtain the first animation corresponding to the target event, and transmits the first animation corresponding to the target event to the second server. After receiving the first animation corresponding to the target event, the second server adds the animation to the region where the first virtual object is defeated to obtain the fourth video frame. In some embodiments, the second server may add the first frame of the animation to the third video frame to obtain the fourth video frame.

603: The second server transmits the fourth video frame to the first terminal, the first terminal being configured to display the fourth video frame.

Before operation 603, the second server may also acquire first audio corresponding to the target event, the first audio being audio of the first terminal. The second server transmits the first audio to the first terminal, the first terminal being configured to play the first audio while displaying the fourth video frame. A correspondence between the target event and the first audio is set through the first terminal. For example, the target event is selected by the first terminal, and the first audio bound to the target event is selected from a plurality of pieces of first audios provided by the client server, or the first audio corresponding to the target event is uploaded to the client server by the first terminal, and the client server binds the first audio to the target event after receiving the first audio uploaded by the first terminal.

For example, the first server also transmits the prompt information bound to the third video frame while transmitting the third video frame to the second server. The second server acquires the identifier of the target event from the prompt information. The second server transmits an animation and audio acquisition request to the client server, the animation and audio acquisition request carrying the identifier of the target event. After receiving the second animation acquisition request, the client server acquires the identifier of the target event from the second animation acquisition request, performs query based on the identifier of the target event to obtain the first animation and the first audio corresponding to the target event, and transmits the first animation and the first audio corresponding to the target event to the second server. After receiving the first animation and the first audio corresponding to the target event, the second server adds the animation to the third video frame to obtain the fourth video frame. The second server transmits the first audio to the first terminal while transmitting the fourth video frame to the first terminal. After receiving the fourth video frame and the first audio, the first terminal plays the first audio while displaying the fourth video frame.

Figure 7:
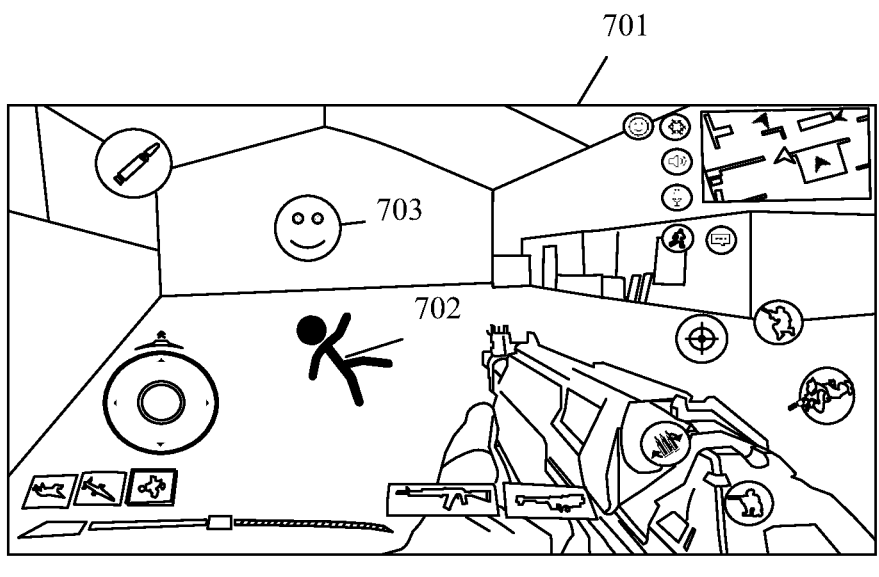
FIG. 7 is a schematic diagram of an interface according to some embodiments.

Also taking the target event being that the controlled virtual object defeating the first virtual object in the virtual scene as an example, in response to the controlled virtual object defeating the first virtual object in the virtual scene, the first server transmits the third video frame and the prompt information bound to the third video frame to the second server. The prompt information carries the identifier of the target event and the position where the first virtual object is defeated. The second server acquires the identifier of the target event and the position where the first virtual object is defeated from the prompt information. The second server transmits an animation and audio acquisition request to the client server, the animation and audio acquisition request carrying the identifier of the target event. After receiving the animation and audio acquisition request, the client server acquires the identifier of the target event from the animation and audio acquisition request, performs query based on the identifier of the target event to obtain the first animation and the first audio corresponding to the target event, and transmits the first animation and the first audio corresponding to the target event to the second server. After receiving the first animation and the first audio corresponding to the target event, the second server adds the animation to the position where the first virtual object is defeated in the third video frame to obtain the fourth video frame. The second server transmits the first audio to the first terminal while transmitting the fourth video frame to the first terminal. After receiving the fourth video frame and the first audio, the first terminal plays the first audio while displaying the fourth video frame. If the animation is an animation that a small person dances, in the fourth video frame, the first audio is played while displaying the animation that the small person dances at the position where the first virtual object is defeated, and the user stimulates himself to achieve better performance in a game by means of the animation and the first audio. With reference to FIG. 7, the second server adds an animation 703 to a fourth video frame 701 at a position 702 where the first virtual object is defeated.

Through the technical solution provided by the embodiments of the disclosure, if it is desired to play a specified animation while transmitting the target event in the target virtual scene, a target animation may be selected for the target event by the first terminal. The second server performs secondary rendering on the video frame to obtain the fourth video frame. Compared with the third video frame, the animation set by the first terminal may be displayed in the fourth video frame. Through such technical solutions, a function of performing secondary rendering on the animation is provided in a cloud application, and the user may quickly and efficiently adjust the display effect of the virtual scene, which extends a functional range of the cloud application and improves the personalization of the cloud application. Therefore, the cloud application is propagated more widely.

In the above description process, the first terminal, the client server, the first server, the second server, and the game server constitute one video frame rendering system. An implementation environment of the video frame rendering method is introduced in FIG. 1, and the functions of various components are briefly introduced there. A video frame rendering system provided by the embodiments of the disclosure is introduced in combination with the above method embodiments, with reference to FIG. 1, the system includes: a first terminal, a first server, and a second server. The first terminal, the first server, and the second server are in communication connection with each other.

The first server may be a cloud server.

The second server may be a scene management server.

The first server is configured to render a target virtual scene from a perspective of a controlled virtual object in the target virtual scene to obtain a first video frame corresponding to the first terminal, and transmit the first video frame to the second server. The controlled virtual object is a virtual object controlled by the first terminal.

The second server is configured to receive the first video frame.

The second server is further configured to render a target virtual object in the first video frame based on a first parameter of the first terminal to obtain a second video frame in a case that the first video frame displays the target virtual object of the first terminal.

The second server is further configured to transmit the second video frame to the first terminal.

The first terminal is configured to display the second video frame in response to receiving the second video frame.

In some embodiments, the first terminal is further configured to transmit control information to the first server. The control information is configured to control an action of the controlled virtual object in the target virtual scene.

The first server is further configured to determine a perspective of the controlled virtual object in the target virtual scene based on the control information, and render the target virtual scene based on the perspective of the controlled virtual object in the target virtual scene to obtain the first video frame.

In some embodiments, the system further includes a client server. The client server is in communication connection with each of the first terminal, the first server, and the second server.

The first terminal is further configured to display a configuration interface of the target virtual object. The configuration interface is used for acquiring configuration information of the target virtual object.

The first terminal is further configured to transmit the configuration information of the target virtual object to the client server in response to an operation on the configuration interface.

The client server is configured to receive the configuration information of the target virtual object, create a three-dimensional model of the target virtual object based on the configuration information of the target virtual object, and acquire the first parameter corresponding to the three-dimensional model.

In some embodiments, the second server is further configured to acquire a first rendering parameter in a case that the first video frame displays a target virtual object of the first terminal. The first rendering parameter is a rendering parameter corresponding to a first angle and a first distance in the first parameter. The first angle is an angle between the controlled virtual object and the target virtual object. The first distance is a distance between the controlled virtual object and the target virtual object. The target virtual object in the first video frame is rendered based on the first rendering parameter to obtain the second video frame.

In some embodiments, the second server is further configured to determine target pixel values of a plurality of target pixel points of the target virtual object in the first video frame based on the first rendering parameter. The pixel values of the plurality of target pixel points in the first video frame are updated by using the target pixel values to obtain the second video frame.

In some embodiments, the second server is further configured to acquire a first rendering parameter and a second rendering parameter from the first parameter in a case that the first video frame displays the target virtual object of the first terminal. In the first video frame, the target virtual object and the controlled virtual object are respectively rendered by using the first rendering parameter and the second rendering parameter to obtain the second video frame.

In some embodiments, the second server is further configured to determine a position of the controlled virtual object in the target virtual scene in a case that the first video frame displays the target virtual object of the first terminal. The target virtual object in the first video frame is rendered based on the first parameter to obtain the second video frame in a case that the controlled virtual object is located in a target sub-scene of the target virtual scene. The first video frame is determined as the second video frame in a case that the controlled virtual object is not located in the target sub-scene of the target virtual scene.

In some embodiments, the second server is further configured to perform image recognition on the first video frame to determine a type of the first video frame. The target virtual object is rendered based on the first parameter to obtain the second video frame in a case that the type indicates that the first video frame displays the target virtual object.

In some embodiments, the second server is further configured to perform detection in the first video frame by using a template image of the target virtual object. In response to detecting that there is a region that matches the template image of the target virtual object in the first video frame, and the first video frame is determined as a first type. The first type indicates that the first video frame displays the target virtual object. In response to detecting that there is no region that matches the template image of the target virtual object in the first video frame, and the first video frame is determined as a second type. The second type indicates that the first video frame does not display the target virtual object.

In some embodiments, the second server is further configured to input the first video frame into an image recognition model. Feature extraction and classification are performed on the first video frame through the image recognition model, and the type of the first video frame is output.

In some embodiments, the second server is further configured to divide the first video frame into a plurality of image blocks, and input the plurality of image blocks into the image recognition model. The operation that the feature extraction and classification are performed on the first video frame through the image recognition model, and the type of the first video frame is output includes: feature extraction and full connection processing are performed on the plurality of image blocks to obtain a plurality of probabilities respectively corresponding to the plurality of image blocks by the image recognition model, the probabilities being the probabilities that the corresponding image blocks include the target virtual object. In response to any of the plurality of probabilities being greater than or equal to a probability threshold value, the first video frame is determined as the first type. The first type indicates that the first video frame displays the target virtual object. In response to each of the plurality of probabilities being less than the probability threshold value, the first video frame is determined as the second type. The second type indicates that the first video frame does not display the target virtual object.

In some embodiments, the second server is further configured to acquire the first parameter from the client server. The client server is configured to create a three-dimensional model of the target virtual object based on a setting parameter uploaded by the first terminal for the target virtual object. The first parameter includes a plurality of rendering parameters of the three-dimensional model.

In some embodiments, the first server is further configured to render the target virtual scene from a perspective of the controlled virtual object to obtain a third video frame corresponding to the first terminal in response to a target event occurring in the target virtual scene, and transmit the third video frame to the second server. The target event is that the controlled virtual object defeats the first virtual object in the target virtual scene.

The second server is further configured to acquire a first animation corresponding to the target event and first audio corresponding to the target event. The first audio is audio of the first terminal.

The second server is further configured to determine a region where the first virtual object is defeated in the third video frame. A first animation corresponding to the target event is added to the region to obtain a fourth video frame. The fourth video frame and the first audio are transmitted to the first terminal.

The first terminal is further configured to play the first audio while displaying the fourth video frame in response to receiving the fourth video frame and the first audio.

In some embodiments, the system further includes a second terminal. The second terminal, the first server, and the second server are in communication connection with each other. The second terminal and the first terminal are different terminals.

The first server is further configured to render the target virtual scene from a perspective of a second virtual object in the target virtual scene to obtain a fifth video frame corresponding to the second terminal, and transmit the fifth video frame to the second server. The second virtual object is a virtual object controlled by the second terminal.

The second server is further configured to perform target processing on the fifth video frame to obtain a sixth video frame in a case that the fifth video frame displays the target virtual object. The sixth video frame is transmitted to the second terminal.

The second terminal is configured to display the sixth video frame in response to receiving the sixth video frame.

In some embodiments, the second server is further configured to perform any one of the following:

rendering the target virtual object in the fifth video frame based on the second parameter of the second terminal to obtain the sixth video frame in a case that the fifth video frame displays the target virtual object;

rendering the target virtual object in the fifth video frame based on the first parameter to obtain the sixth video frame in a case that the fifth video frame displays the target virtual object; and adding a second animation corresponding to the target virtual object to the fifth video frame to obtain the sixth video frame in a case that the fifth video frame displays the target virtual object.

In some embodiments, the second server is further configured to compare the virtual levels of the controlled virtual object and the second virtual object in a case that the fifth video frame displays the target virtual object. The target virtual object in the fifth video frame is rendered based on the first parameter to obtain the sixth video frame in a case that the virtual level of the controlled virtual object is higher than the virtual level of the second virtual object. The target virtual object in the fifth video frame is rendered based on the second parameter of the second terminal to obtain the sixth video frame in a case that the virtual level of the controlled virtual object is lower than the virtual level of the second virtual object. The target virtual object in the fifth video frame is rendered based on a third parameter to obtain the sixth video frame in a case that the virtual levels of the controlled virtual object and the second virtual object are the same.

In some embodiments, the second server is further configured to acquire a second animation and second audio corresponding to the target virtual object. The second animation corresponding to the target virtual object is added to the second video frame to obtain a seventh video frame. The seventh video frame and the second audio are transmitted to the first terminal. The first terminal is configured to play the second audio while displaying the seventh video frame.

In some embodiments, the second server is further configured to perform any one of the following:

aggregating a plurality of the second video frames into a first video frame set, and transmitting the first video frame set to the first terminal, the first terminal being configured to share the first video frame set with other terminals;

concatenating the second video frame and the first video frame to obtain a concatenated video frame; and aggregating a plurality of the spliced video frames into a second video frame set, and transmitting the second video frame set to the first terminal, the first terminal being configured to share the second video frame set with other terminals.

In some embodiments, the second server is further configured to acquire the first parameter from the client server. The client server is configured to create a three-dimensional model of the target virtual object based on a setting parameter uploaded by the first terminal for the target virtual object. The first parameter includes a plurality of rendering parameters of the three-dimensional model.

A video frame rendering system provided by the embodiments of the disclosure will be described with reference to FIG. 1 and operations 301 to 308 and 601 to 603 above.

The first terminal displays a configuration interface of the target virtual object. The configuration interface is used for acquiring configuration information of the target virtual object. The configuration information of the target virtual object is transmitted to the client server in response to an operation on the configuration interface. The client server receives the configuration information of the target virtual object, creates a three-dimensional model of the target virtual object based on the configuration information of the target virtual object, and acquires a first parameter corresponding to the three-dimensional model. Taking a game scene as an example, the first terminal starts a target cloud game, maintains a long connection with a client server, and transmits game start instructions to the client server. The game start instructions carry a user account, an identifier of the target cloud game, and hardware information of the first terminal. After receiving the game start instructions, the client server transmits the game start instructions to the first server. After receiving the game start instructions, the first server acquires the user account, the identifier of the target cloud game, and the hardware information of the first terminal from the game start instructions. The first server initializes the target cloud game based on the hardware information of the first terminal to realize matching between a rendered game picture and the first terminal, and transmits the user account to the game server corresponding to the target cloud game. After receiving the user account, the game server transmits information corresponding to the game account to the first server. The first server starts the target cloud game based on the information corresponding to the game account. In a process of running the target cloud game, a target virtual scene of the target cloud game is displayed, and the target virtual scene displays the controlled virtual object. The first terminal transmits control information of the controlled virtual object to the first serve. After receiving the control information, the first server determines a perspective of the controlled virtual object in the target virtual scene based on the control information. The first server renders the target virtual scene based on the perspective of the controlled virtual object to obtain a first video frame. The first video frame is also a video frame corresponding to the first terminal. The first server transmits the first video frame to the second server. If the user personalizes a certain virtual object in the target cloud game before the game starts, for example, sets a car in the target cloud game to red, then the second server may perform image recognition on the first video frame and determine whether the first video frame includes the car. If the second server determines that the first video frame displays the car, then a first parameter for the car is acquired from the client server. The first parameter is determined by the client server based on a setting parameter for the car by the user. The second server renders the car in the first video frame based on the first parameter to obtain a second video frame, and transmits the second video frame to the first terminal. The user may view the second video frame through the first terminal. If a technician configures the color of the car to blue in the target cloud game, then the color of the car may be adjusted to the user-set red through the above operations to achieve personalized configuration for the car.

Through the technical solutions provided by the embodiments of the disclosure, if it is desired to change a display effect of a certain virtual object, the first parameter may be determined for the virtual object by the first terminal, and the server performs secondary rendering the video frame based on the first parameter to obtain the second video frame. Compared with the first video frame, the display effect of the virtual object displayed in the second video frame is also the display effect configured by the first terminal for the virtual object. Through such technical solutions, a function of performing secondary rendering on the virtual object is provided in a cloud application, and the user may quickly and efficiently adjust the display effect of the certain virtual object in the virtual scene, which extends a functional range of the cloud application and improves the personalization of the cloud application. Therefore, the cloud application is propagated more widely.

Figure 8:
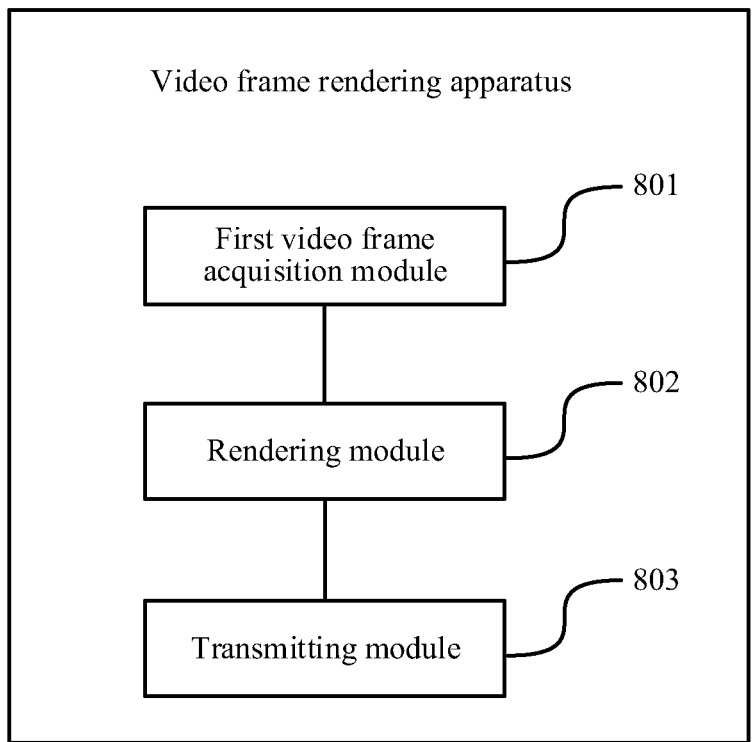
FIG. 8 is a schematic diagram of a structure of a video frame rendering apparatus according to some embodiments.

FIG. 8 is a schematic diagram of a structure of a video frame rendering apparatus provided by an embodiment of the disclosure. With reference to FIG. 8, the apparatus includes: a first video frame acquisition module 801, a rendering module 802, and a transmitting module 803.

The first video frame acquisition module 801 is configured to acquire a first video frame corresponding to a first terminal. The first video frame is a video frame obtained by rendering a target virtual scene from a perspective of a controlled virtual object in the target virtual scene. The controlled virtual object is a virtual object controlled by the first terminal.

The rendering module 802 is configured to render the target virtual object in the first video frame based on the first parameter of the first terminal to obtain a second video frame in a case that the first video frame displays the target virtual object of the first terminal.

The transmitting module 803 is configured to transmit the second video frame to the first terminal. The first terminal is configured to display the second video frame.

In some embodiments, the rendering module 802 is configured to acquire a first rendering parameter in a case that the first video frame displays a target virtual object of the first terminal. The first rendering parameter is a rendering parameter corresponding to a first angle and a first distance in the first parameter. The first angle is an angle between the controlled virtual object and the target virtual object. The first distance is a distance between the controlled virtual object and the target virtual object. The target virtual object in the first video frame is rendered based on the first rendering parameter to obtain the second video frame.

In some embodiments, the rendering module 802 is configured to determine target pixel values of a plurality of target pixel points of the target virtual object in the first video frame based on the first rendering parameter. The pixel values of the plurality of target pixel points in the first video frame are updated by using the target pixel values to obtain the second video frame.

In some embodiments, the rendering module 802 is configured to acquire a first rendering parameter and a second rendering parameter from the first parameter in a case that the first video frame displays the target virtual object of the first terminal. In the first video frame, the target virtual object and the controlled virtual object are respectively rendered by using the first rendering parameter and the second rendering parameter to obtain the second video frame.

In some embodiments, the rendering module 802 is configured to determine the position of the controlled virtual object in the target virtual scene in a case that the first video frame displays the target virtual object of the first terminal. The target virtual object in the first video frame is rendered based on the first parameter to obtain the second video frame in a case that the controlled virtual object is located in a target sub-scene of the target virtual scene.

In some embodiments, the rendering module 802 is further configured to determine the first video frame as the second video frame in a case that the controlled virtual object is not located in a target sub-scene of the target virtual scene.

In some embodiments, the apparatus further includes:

an image recognition module, configured to perform image recognition on the first video frame, and determine a type of the first video frame.

The rendering module 802 is configured to render the target virtual object based on the first parameter to obtain the second video frame in a case that the type indicates that the first video frame displays the target virtual object.

In some embodiments, the image recognition module is configured to perform detection in the first video frame by using a template image of the target virtual object. In response to detecting that there is a region that matches the template image of the target virtual object in the first video frame, and the first video frame is determined as a first type. The first type indicates that the first video frame displays the target virtual object. In response to detecting that there is no region that matches the template image of the target virtual object in the first video frame, and the first video frame is determined as a second type. The second type indicates that the first video frame does not display the target virtual object.

In some embodiments, the image recognition module is configured to input the first video frame into an image recognition model, perform feature extraction and classification on the first video frame through the image recognition model, and output a type of the first video frame.

In some embodiments, the image recognition module is configured to divide the first video frame into a plurality of image blocks, and input the plurality of image blocks into the image recognition model. Feature extraction and full connection processing are performed on the plurality of image blocks to obtain a plurality of probabilities respectively corresponding to the plurality of image blocks by the image recognition model. The probabilities are the probabilities that the corresponding image blocks include the target virtual object. In response to any of the plurality of probabilities being greater than or equal to a probability threshold value, the first video frame is determined as the first type. The first type indicates that the first video frame displays the target virtual object. In response to each of the plurality of probabilities being less than the probability threshold value, the first video frame is determined as the second type. The second type indicates that the first video frame does not display the target virtual object.

In some embodiments, the apparatus further includes:

a third video frame acquisition module, configured to acquire a third video frame corresponding to the first terminal. The third video frame is a video frame obtained by rendering a target virtual scene from a perspective of the controlled virtual object after a target event occurs in the target virtual scene. The target event is that the controlled virtual object defeats the first virtual object in the target virtual scene.

The rendering module 802 is further configured to acquire a first animation corresponding to the target event and first audio corresponding to the target event. The first audio is audio of the first terminal. A region where the first virtual object is defeated is determined in the third video frame. A first animation corresponding to the target event is added to the region to obtain a fourth video frame.

The transmitting module 803 is further configured to transmit the fourth video frame and the first audio to the first terminal. The first terminal is configured to play the first audio while displaying the fourth video frame.

In some embodiments, the target virtual scene further includes a second virtual object. The second virtual object is a virtual object controlled by a second terminal. The second terminal and the second terminal are different terminals. The apparatus further includes:

a fifth video frame acquisition module, configured to acquire a fifth video frame corresponding to the second terminal, the fifth video frame being a video frame obtained by rendering the target virtual scene from the perspective of the second virtual object.

The rendering module 802 is further configured to perform target processing on the fifth video frame to obtain a sixth video frame in a case that the fifth video frame displays the target virtual object.

The transmitting module 803 is further configured to transmit the sixth video frame to the second terminal. The second terminal is configured to display the sixth video frame.

In some embodiments, the rendering module 802 is further configured to perform any one of the following:

rendering the target virtual object in the fifth video frame based on the second parameter of the second terminal to obtain the sixth video frame in a case that the fifth video frame displays the target virtual object;

rendering the target virtual object in the fifth video frame based on the first parameter to obtain the sixth video frame in a case that the fifth video frame displays the target virtual object; and adding a second animation corresponding to the target virtual object to the fifth video frame to obtain the sixth video frame in a case that the fifth video frame displays the target virtual object.

In some embodiments, the controlled virtual object and the second virtual object are simultaneously located in a target sub-scene of the target virtual scene, and the rendering module 802 is further configured to compare virtual levels of the controlled virtual object and the second virtual object in a case that the fifth video frame displays the target virtual object. The target virtual object in the fifth video frame is rendered based on the first parameter to obtain the sixth video frame in a case that the virtual level of the controlled virtual object is higher than the virtual level of the second virtual object. The target virtual object in the fifth video frame is rendered based on the second parameter of the second terminal to obtain the sixth video frame in a case that the virtual level of the controlled virtual object is lower than the virtual level of the second virtual object. The target virtual object in the fifth video frame is rendered based on a third parameter to obtain the sixth video frame in a case that the virtual levels of the controlled virtual object and the second virtual object are the same.

In some embodiments, the rendering module 802 is further configured to acquire a second animation and second audio corresponding to the target virtual object. The second animation corresponding to the target virtual object is added to the second video frame to obtain a seventh video frame.

The transmitting module 803 is further configured to transmit the seventh video frame and the second audio to the first terminal. The first terminal is configured to play the second audio while displaying the seventh video frame.

In some embodiments, the apparatus further includes a video frame set generation module. The video frame set generation module is configured to perform any one of the following:

aggregating a plurality of the second video frames into a first video frame set, and transmitting the first video frame set to the first terminal, the first terminal being configured to share the first video frame set with other terminals;

concatenating the second video frame and the first video frame to obtain a concatenated video frame; and aggregating a plurality of the spliced video frames into a second video frame set, and transmitting the second video frame set to the first terminal, the first terminal being configured to share the second video frame set with other terminals.

In some embodiments, the apparatus further includes:

a parameter acquisition module, configured to acquire the first parameter from a client server. The client server is configured to create a three-dimensional model of the target virtual object based on a setting parameter uploaded by the first terminal for the target virtual object. The first parameter includes a plurality of rendering parameters of the three-dimensional model.

The video frame rendering apparatus provided in the above embodiments only exemplifies the division of the above functional modules when performing secondary rendering on a video frame. In practical applications, the above functions may be allocated to different functional modules for completing, that is, the internal structure of a server is divided into different functional modules to complete all or part of the functions described above. In addition, the video frame rendering apparatus and the video frame rendering method provided by the above embodiments fall within the same concept. For a specific implementation process, refer to the method embodiment, and details are not described again herein.

Through the technical solutions provided by the embodiments of the disclosure, if it is desired to change a display effect of a certain virtual object, the first parameter may be determined for the virtual object by the first terminal, and the server performs secondary rendering the video frame based on the first parameter to obtain the second video frame. Compared with the first video frame, the display effect of the virtual object displayed in the second video frame is also the display effect configured by the first terminal for the virtual object. Through such technical solutions, a function of performing secondary rendering on the virtual object is provided in a cloud application, and the user may quickly and efficiently adjust the display effect of the certain virtual object in the virtual scene, which extends a functional range of the cloud application and improves the personalization of the cloud application. Therefore, the cloud application is propagated more widely.

Figure 9:
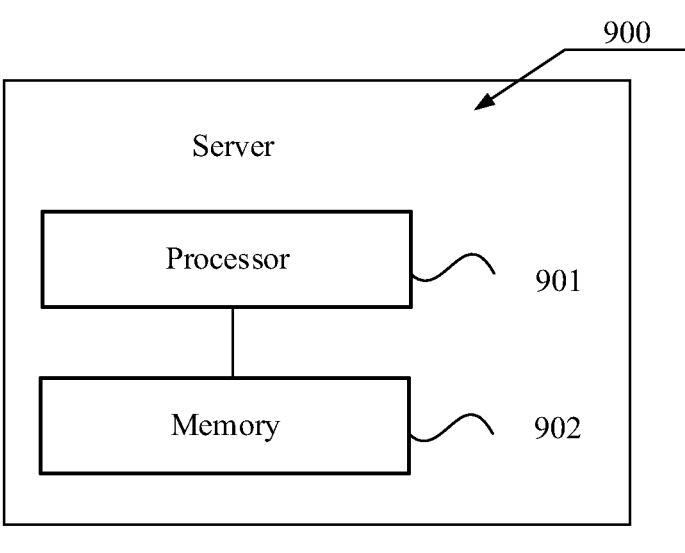
FIG. 9 is a schematic diagram of a structure of a server according to some embodiments.

The structure of the server is described below:

FIG. 9 is a schematic diagram of a structure of a server provided by an embodiment of the disclosure. The server 900 may produce a relatively large difference due to different configuration performance, and may include one or more central processing units (CPU) 901 and one or more memory 902. The one or more memories 902 store at least one computer program. The at least one computer program is loaded and executed by the one or more processors 901 to implement the method provided by each method embodiment. Of course, the server 900 may also have a wired or wireless network interface, a keyboard, and an input/output interface, and the like, so as to perform input and output. The server 900 may also include other components for implementing device functions, which will not be described in detail herein.

In an exemplary embodiment, a computer-readable storage medium is further provided, for example, a memory including a computer program. The above computer program may be executed by the processor to perform the video frame rendering method in the above embodiments. For example, the computer-readable storage medium may be a read-only memory (ROM), a random access memory (RAM), a compact disc read-only memory (CD-ROM), a magnetic tape, a floppy disk, an optical data storage device, and the like.

In an exemplary embodiment, a computer program product or a computer program is provided. The computer program product or the computer program includes a program code. The program code is stored in the computer-readable storage medium. A processor of a computer device reads the program code from the computer-readable storage medium. The processor executes the program code, so that the computer device performs the video frame rendering method. That is, the program code, when executed by the processor, implements the video frame rendering method.

In some embodiments, a computer program involved in the embodiments of the disclosure may be deployed to be executed on one computer device, or on a plurality of computer devices located at one site, or on a plurality of computer devices distributed at a plurality of sites and interconnected by a communication network. The plurality of computer devices distributed at the plurality of sites and interconnected by the communication network may form a block chain system.

A person of ordinary skill in the art may understand that all or some of the operations of the foregoing embodiments may be implemented by using hardware, or may be implemented by a program instructing relevant hardware. The program may be stored in a computer-readable storage medium. The above storage medium may be a read-only memory, a magnetic disk, an optical disk, or the like.

The foregoing descriptions are merely optional embodiments of the disclosure, but are not intended to limit the disclosure. Any modification, equivalent replacement, or improvement made without departing from the spirit and principle of the disclosure shall fall within the scope of the protection of the disclosure.

What is claimed is:

1. A video frame rendering method performed by at least one processor, the method comprising:

acquiring, by a second server from a first server, a first video frame rendered by the first server for display on a first terminal, the first video frame representing a virtual scene comprising a plurality of virtual objects from a perspective of a first virtual object;

obtaining, by the second server, a customization setting associated with a target object in the target virtual scene, the target object being one of the plurality of the virtual objects in the target virtual scene;

obtaining, by the second server, based on the customization setting, an updated rendering of the target virtual object in the target virtual scene;

generating, by the second server, a second video frame where the target virtual object is replaced with the updated rendering of the target virtual object in the target virtual scene and other virtual objects among the plurality of virtual objects are not replaced with updated renderings of the other virtual objects in the target virtual scene; and transmitting, by the second server, the second video frame to a first terminal.

2. The method according to claim 1, wherein the second server is a cloud gaming server and the first terminal is a cloud gaming client.

3. The method according to claim 1, further comprising:

identifying the target virtual object from the plurality of virtual objects based on the customization setting.

4. The method according to claim 3, wherein the identifying the target virtual object comprises image recognition.

5. The method according to claim 1, wherein the customization setting is set by a user of the first terminal.

6. The method according to claim 1, wherein the updated rendering of the target virtual object has an appearance that is different from the original target virtual object.

7. The method according to claim 1, wherein the updated rendering of the target virtual object is further based on a spatial relationship between the target virtual object and a virtual camera observing the virtual scene, the virtual camera being associated with the first terminal.

8. The method according to claim 7, further comprising determining the spatial relationship based on the first video frame.

9. The method according to claim 1, wherein the generating, by the second server, the second video frame comprises:

determining a plurality of target pixels of the first video frame corresponding to the target virtual object; and updating a plurality of pixel values of the plurality of target pixels in the first video frame based on the updated rendering of the target virtual object to obtain the second video frame.

10. The method according to claim 1, further comprising superimposing, based on the customization setting, a visual effect to the first video frame to obtain the second video frame.

11. The method according to claim 1, wherein the customization setting is set by a user of a second terminal, the second terminal being different from the first terminal.

12. A video frame rendering apparatus, comprising:

at least one memory configured to store program code; and at least one processor configured to read the program code and operate as instructed by the program code, the program code comprising:

acquiring code configured to cause the at least one processor to acquire, by a second server- and from a first server, a first video frame rendered by the first server for display on a first terminal, the first video frame representing a virtual scene comprising a plurality of virtual objects from a perspective of a first virtual object;

first obtaining code configured to cause the at least one processor to obtain, by the second server, a customization setting associated with a target object in the target virtual scene, the target object being one of the plurality of the virtual objects in the target virtual scene;

second obtaining code configured to cause the at least one processor to obtain, by the second server, based on the customization setting, an updated rendering of the target virtual object in the target virtual scene;

generating code configured to cause the at least one processor to generate, by the second server, a second video frame where the target virtual object is replaced with the updated rendering of the target virtual object in the target virtual scene and other virtual objects among the plurality of virtual objects are not replaced with updated renderings of the other virtual objects in the target virtual scene; and transmitting code configured to cause the at least one processor to transmit, by the second server, the second video frame to a first terminal.

13. The apparatus according to claim 12, wherein the second server is a cloud gaming server and the first terminal is a cloud gaming client.

14. The apparatus according to claim 12, wherein the program code further includes:

identifying code configured to cause the at least one processor to identify the target virtual object from the plurality of virtual objects based on the customization setting.

15. The apparatus according to claim 14, wherein the identifying code further comprises image recognition code configured to cause the at least one processor to perform image recognition to identify the target virtual object.

16. The apparatus according to claim 12, wherein the customization setting is set by a user of the first terminal.

17. The apparatus according to claim 12, wherein the updated rendering of the target virtual object has an appearance that is different from the original target virtual object.

18. The apparatus according to claim 12, wherein the first obtaining code is further configured to cause the at least one processor to determine a spatial relationship between the target virtual object and a virtual camera observing the virtual scene, the virtual camera being associated with the first terminal.

19. The apparatus according to claim 18, wherein the program code further comprises determining code configured to cause the at least one processor to determine the spatial relationship based on the first video frame.

20. A non-transitory computer-readable storage medium, storing a computer program that when executed by at least one processor causes the at least one processor to:

acquire, from a first server, a first video frame corresponding to a first terminal, the first video frame being obtained by the first server rendering a target virtual scene comprising a plurality of virtual objects from a perspective of a first virtual object;

obtain a customization setting associated with a target object in the target virtual scene, the target object being one of the plurality of the virtual objects in the target virtual scene;

obtain based on the customization setting, an updated rendering of the target virtual object in the target virtual scene;

generate a second video frame where target virtual object is replaced with the updated rendering of the target virtual object in the target virtual scene and other virtual objects among the plurality of virtual objects are not replaced with updated renderings of the other virtual objects in the target virtual scene;

transmit the second video frame to a first terminal.

\* \* \* \* \*